(12) United States Patent
Kim

(10) Patent No.: US 6,897,849 B2
(45) Date of Patent: May 24, 2005

(54) KEY INPUT DEVICE AND CHARACTER INPUT METHOD USING DIRECTIONAL KEYS

(75) Inventor: Jae-Wook Kim, Daegukwangyeok-shi (KR)

(73) Assignee: Samsung Electronics Co., Ltd. (KR)

( * ) Notice: Subject to any disclaimer, the term of this patent is extended or adjusted under 35 U.S.C. 154(b) by 396 days.

(21) Appl. No.: 09/901,230

(22) Filed: Jul. 9, 2001

(65) Prior Publication Data

US 2002/0063687 A1 May 30, 2002

(30) Foreign Application Priority Data

Sep. 14, 2000 (KR) .......................................... 2000-53980
Feb. 8, 2001 (KR) ........................................... 2001-6208

(51) Int. Cl.[7] ................................................ G09G 5/00
(52) U.S. Cl. ......................... 345/160; 345/156; 341/20; 341/22; 341/28; 379/433.06; 379/433.07; 715/810
(58) Field of Search ............................. 345/156, 160, 345/168–169, 170, 171, 172–175, 835; 341/20–22, 28; 455/550, 566, 575, 90; 379/433.07, 433.01, 433.06; 708/131, 142

(56) References Cited

U.S. PATENT DOCUMENTS

| | | | | |
|---|---|---|---|---|
| 5,198,802 A | * | 3/1993 | Bertram et al. ............. | 345/860 |
| 5,543,818 A | * | 8/1996 | Scott ........................... | 345/168 |
| 5,805,167 A | * | 9/1998 | van Cruyningen .......... | 345/808 |
| 6,037,942 A | * | 3/2000 | Millington ................... | 345/835 |
| 6,097,964 A | * | 8/2000 | Nuovo et al. ............... | 455/566 |
| 6,459,390 B1 | * | 10/2002 | Kim ............................. | 341/20 |
| 6,563,923 B2 | * | 5/2003 | Otsuka ........................ | 379/368 |
| 6,567,072 B2 | * | 5/2003 | Watanabe .................... | 345/161 |
| 2002/0054135 A1 | * | 5/2002 | Noguchi et al. ............ | 345/788 |
| 2003/0169188 A1 | * | 9/2003 | Chang .......................... | 341/22 |

FOREIGN PATENT DOCUMENTS

EP 1136905 A * 9/2001

OTHER PUBLICATIONS

May 2, 2002, Combined Search And Examination Report issued in counterpart foreign application no. GB 0121271.1.

* cited by examiner

Primary Examiner—Henry N. Tran
Assistant Examiner—Peter Prizio, Jr.
(74) Attorney, Agent, or Firm—Dilworth & Barrese LLP

(57) ABSTRACT

A key input device is provided for inputting digits/letters/characters/symbols by a keypad and a character input method for the key input device. In the key input device, a mode key is pressed to select one of a plurality of key matrixes for a corresponding mode, which is displayed on a display. A first directional key is used for inter-cell movement in the displayed key matrix and a second directional key is used to select an intended digit/letter/character/symbol within a cell. In the character input method, a mode with a unique key matrix is set by pressing a mode key. An intended cell is moved to within the key matrix by pressing a first directional key. An intended digit/letter/character/symbol is selected in the cell by pressing a second directional key. The selected digit/letter/character/symbol is displayed on a display.

15 Claims, 38 Drawing Sheets

|  | 4-D KEY "B" | | | | |
|---|---|---|---|---|---|
|  | a | b | c | d | e |
|  | a | b | c | d | e |
| A | Aa | Ab | Ac | Ad | Ae |
| B | Ba | Bb | Bc | Bd | Be |
| C | Ca | Cb | Cc | Cd | Ce |
| D | Da | Db | Dc | Dd | De |
| E | Ea | Eb | Ec | Ed | Ee |

(4-D KEY "A" labels rows A–E)

FIG. 8C

| NO | KEY COMBINATIONS | FUNCTIONS |
|---|---|---|
| 1 | a | FUNCTION "F1" |
| 2 | b | FUNCTION "F2" |
| 3 | c | FUNCTION "F3" |
| 4 | d | FUNCTION "F4" |
| 5 | e | FUNCTION "F5" |
| 6 | Aa | FUNCTION "F6" |
| 7 | Ab | FUNCTION "F7" |
| 8 | Ac | FUNCTION "F8" |
| 9 | Ad | FUNCTION "F9" |
| 10 | Ae | FUNCTION "F10" |
| 11 | Ba | FUNCTION "F11" |
| 12 | Bb | FUNCTION "F12" |
| 13 | Bc | FUNCTION "F13" |
| 14 | Bd | FUNCTION "F14" |
| 15 | Be | FUNCTION "F15" |
| 16 | Ca | FUNCTION "F16" |
| 17 | Cb | FUNCTION "F17" |
| 18 | Cc | FUNCTION "F18" |
| 19 | Cd | FUNCTION "F19" |
| 20 | Ce | FUNCTION "F20" |
| 21 | Da | FUNCTION "F21" |
| 22 | Db | FUNCTION "F22" |
| 23 | Dc | FUNCTION "F23" |
| 24 | Dd | FUNCTION "F24" |
| 25 | De | FUNCTION "F25" |
| 26 | Ea | FUNCTION "F26" |
| 27 | Eb | FUNCTION "F27" |
| 28 | Ec | FUNCTION "F28" |
| 29 | Ed | FUNCTION "F29" |
| 30 | Ee | FUNCTION "F30" |

FIG. 8D

|  | 4-D KEY "B" | | | | |
|---|---|---|---|---|---|
|  | a | b | c | d | e |
|  |  | a | b | c | d | e |
| 4-D KEY "A" | A | Aa | Ab | Ac | Ad | Ae |
| | B | Ba | Bb | Bc | Bd | Be |
| | C | Ca | Cb | Cc | Cd | Ce |
| | D | Da | Db | Dc | Dd | De |
| | E | Ea | Eb | Ec | Ed | Ee |

FIG. 10C

| NO | KEY COMBINATIONS | FUNCTIONS |
|---|---|---|
| 1 | a | 6 |
| 2 | b | 7 |
| 3 | c | 9 |
| 4 | d | 0 |
| 5 | e | 8 |
| 6 | Aa | - |
| 7 | Ab | - |
| 8 | Ac | - |
| 9 | Ad | - |
| 10 | Ae | - |
| 11 | Ba | 1 |
| 12 | Bb | 2 |
| 13 | Bc | 3 |
| 14 | Bd | 4 |
| 15 | Be | 5 |
| 16 | Ca | 3 |
| 17 | Cb | * |
| 18 | Cc | # |
| 19 | Cd | / |
| 20 | Ce | - |
| 21 | Da | @ |
| 22 | Db | - |
| 23 | Dc | - |
| 24 | Dd | - |
| 25 | De | - |
| 26 | Ea | - |
| 27 | Eb | - |
| 28 | Ec | - |
| 29 | Ed | - |
| 30 | Ee | - |

FIG. 10D

|  | 4-D KEY "B" | | | | |
|---|---|---|---|---|---|
|  | a | b | c | d | e |
|  | a | b | c | d | e |
| A | Aa | Ab | Ac | Ad | Ae |
| B | Ba | Bb | Bc | Bd | Be |
| C | Ca | Cb | Cc | Cd | Ce |
| D | Da | Db | Dc | Dd | De |
| E | Ea | Eb | Ec | Ed | Ee |

(Row labels A–E on left side: 4-D KEY "A")

FIG. 12C

| NO | KEY COMBINATIONS | FUNCTIONS |
|---|---|---|
| 1 | a | o |
| 2 | b | e |
| 3 | c | i |
| 4 | d | u |
| 5 | e | a |
| 6 | Aa | h |
| 7 | Ab | j |
| 8 | Ac | l |
| 9 | Ad | m |
| 10 | Ae | k |
| 11 | Ba | b |
| 12 | Bb | c |
| 13 | Bc | f |
| 14 | Bd | g |
| 15 | Be | d |
| 16 | Ca | n |
| 17 | Cb | p |
| 18 | Cc | r |
| 19 | Cd | s |
| 20 | Ce | q |
| 21 | Da | t |
| 22 | Db | v |
| 23 | Dc | y |
| 24 | Dd | z |
| 25 | De | w |
| 26 | E | X |
| 27 | | |
| 28 | | |
| 29 | | |
| 30 | | |

FIG. 12D

|  | 4-D KEY "B" | | | | |
|---|---|---|---|---|---|
|  | a | b | c | d | e |
|  | a | b | c | d | e |
| A | Aa | Ab | Ac | Ad | Ae |
| B | Ba | Bb | Bc | Bd | Be |
| C | Ca | Cb | Cc | Cd | Ce |
| D | Da | Db | Dc | Dd | De |
| E | Ea | Eb | Ec | Ed | Ee |

(Left side label: 4-D KEY "A")

FIG. 14C

| NO | KEY COMBINATIONS | FUNCTIONS |
|---|---|---|
| 1 | a | O |
| 2 | b | E |
| 3 | c | I |
| 4 | d | U |
| 5 | e | A |
| 6 | Aa | B |
| 7 | Ab | J |
| 8 | Ac | L |
| 9 | Ad | M |
| 10 | Ae | K |
| 11 | Ba | B |
| 12 | Bb | C |
| 13 | Bc | F |
| 14 | Bd | G |
| 15 | Be | D |
| 16 | Ca | N |
| 17 | Cb | P |
| 18 | Cc | R |
| 19 | Cd | S |
| 20 | Ce | Q |
| 21 | Da | T |
| 22 | Db | V |
| 23 | Dc | Y |
| 24 | Dd | Z |
| 25 | De | W |
| 26 | E | X |
| 27 | | |
| 28 | | |
| 29 | | |
| 30 | | |

FIG. 14D

|  | 4-D KEY "B" | | | | | 4-D KEY "B","B" | | |
|---|---|---|---|---|---|---|---|---|
|  | a | b | c | d | e | a,d | b,c | e |
|  | a | b | c | d | e | a,d | b,c | e |
| 4-D KEY "A" A | Aa | Ab | Ac | Ad | Ae | | | |
| B | Ba | Bb | Bc | Bd | Be | | | |
| C | Ca | Cb | Cc | Cd | Ce | | | |
| D | Da | Db | Dc | Dd | De | | | |
| E | Ea | Eb | Ec | Ed | Ee | | | |

FIG. 16C

| NO | KEY COMBINATIONS | FUNCTIONS |
|---|---|---|
| 1 | a | ㄱ |
| 2 | b | ㄷ |
| 3 | c | ㅍ |
| 4 | d | ㅎ |
| 5 | e | · |
| 6 | Ba | ㄱ |
| 7 | Bb | ㄷ |
| 8 | Bc | ㅅ |
| 9 | Bd | ㅈ |
| 10 | Be | ㅂ |
| 11 | BBa | ㄲ |
| 12 | BBb | ㄸ |
| 13 | BBc | ㅆ |
| 14 | BBd | ㅉ |
| 15 | BBe | ㅃ |
| 16 | Ca | ㄴ |
| 17 | Cb | ㄹ |
| 18 | Cc | ㅇ |
| 19 | Cd | ㅊ |
| 20 | Ce | ㅁ |
| 21 | Da | — |
| 22 | Db | — |
| 23 | Dc | — |
| 24 | Dd | — |
| 25 | De | — |
| 26 | Ea | — |
| 27 | Eb | — |
| 28 | Ec | — |
| 29 | Ed | — |
| 30 | Ee | — |
| 31 | a,b | ㅣ |
| 32 | b,c | — |
| 33 | e | · |

FIG. 16D

KEY INPUT DEVICE AND CHARACTER INPUT METHOD USING DIRECTIONAL KEYS

PRIORITY

This application claims priority to an application entitled "KEY INPUT DEVICE AND CHARACTER INPUT METHOD USING DIRECTIONAL KEYS" filed in the Korean Industrial Property Office on Sep. 14, 2000 and assigned Ser. No. 2000-53980, and to an application entitled "KEY INPUT DEVICE AND CHARACTER INPUT METHOD USING DIRECTIONAL KEYS" filed in the Korean Industrial Property Office on Feb. 8, 2001 and assigned Ser. No. 2001-6208, the contents of both of which are hereby incorporated by reference.

BACKGROUND OF THE INVENTION

1. Field of the Invention

The present invention relates generally to a key structure, a key input device, and a character input method in an apparatus for inputting digits and characters using a keypad, and in particular, to a method for representing all characters available in a known 3×4 key input scheme by use of a small number of keys.

2. Description of the Related Art

Many key input devices and character input methods have been developed in the field of mobile radio terminals in order to easily represent intended characters, while minimizing the area of the key input devices along with the trend of reducing the size of the terminal. They include the known 3×4 key input scheme, a 2-way slide key input scheme, and a 4-way key input scheme. The latter two schemes were suggested as alternatives for the 3×4 key input scheme.

Due to the minimum space requirement of a keypad, the 3×4 key input scheme was an obstacle to miniaturization of mobile radio terminals. "Minimum space requirement" refers to a minimum space required for precise selection of an intended key and isolation of the key from its adjacent keys on a keypad when a user manipulates the keypad. That is, for a terminal to recognize a key pressed by the user, the key should be spaced from its adjacent keys by a distance enough to prevent the key pressing from influencing the adjacent keys. The 2-way slide key input scheme and the 4-way key input scheme appear to be favorable candidates for the replacement of the 3×4 key input scheme in that they contribute to the reduction of the minimum space requirement of the keypad. Despite this advantage, their key input mechanisms cause a user inconvenience and time delay in key input. Particularly, a longer time is required to enter Korean alphabet characters (Hangul).

SUMMARY OF THE INVENTION

It is, therefore, an object of the present invention to provide a key input device and a character input method, which minimize the space of a keypad, solving the conventional problems encountered in key input.

It is another object of the present invention to provide a key input scheme which allows intended characters to be easily input in a minimized key input device and a character input method for the key input device.

It is a further object of the present invention to provide a key input scheme for readily adding intended characters in a key input device and a character input method.

The foregoing and other objects are achieved by a key input device for inputting digits/letters/characters/symbols by a keypad and a character input method for the key input device. In the key input device, a mode key is pressed to select one of a plurality of key matrixes for a corresponding mode, which is displayed on a display. A first directional key is used for inter-cell movement in the displayed key matrix and a second directional key is used to select an intended digit/letter/character/symbol within a cell. In the character input method, a mode with a unique key matrix is set by pressing a mode key. An intended cell is moved to within the key matrix by pressing a first directional key. An intended digit/letter/character/symbol is selected in the cell by pressing a second directional key. The selected digit/letter/character/symbol is displayed on a display.

BRIEF DESCRIPTION OF THE DRAWINGS

The above and other objects, features and advantages of the present invention will become more apparent from the following detailed description when taken in conjunction with the accompanying drawings in which:

FIG. 8C illustrates a table listing combinations of the two 4-D keys for selection of the function options according to the second embodiment of the present invention;

FIG. 8D illustrates a table listing function options versus combinations of the two 4-D keys according to the second embodiment of the present invention;

FIG. 10C illustrates a table listing combinations of the two 4-D keys for selecting digits in the digit mode according to the second embodiment of the present invention;

FIG. 10D illustrates a table listing numerals versus combinations of the two 4-D keys in the digit mode according to the second embodiment of the present invention;

FIG. 12C illustrates a table listing combinations of the two 4-directional keys for selecting English small alphabet letters in the English small mode according to the second embodiment of the present invention;

FIG. 12D is a table listing English small alphabet letters versus combinations of the two 4-D keys in the English small mode according to the second embodiment of the present invention;

FIG. 14C illustrates a table listing combinations of the two 4-D keys for selecting English capital alphabet letters in the English capital mode according to the second embodiment of the present invention;

FIG. 14D is a table listing English capital alphabet letters versus combinations of the two 4-D keys in the English capital mode according to the second embodiment of the present invention;

FIG. 16C illustrates a table listing combinations of the two 4-directional keys for selecting Korean alphabet characters in the Korean mode according to the second embodiment of the present invention;

FIG. 16D is a table listing Korean alphabet characters versus combinations of the two 4-D keys in the Korean mode according to the second embodiment of the present invention;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

A "key matrix" used herein indicates an arrangement of keys preset to represent characters in a corresponding language mode according to a 4-directional (4-D) key structure of the present invention in a mobile radio terminal. It is also to be noted that blocks of characters in the key matrix are termed cells. All characters available in the 3×4 key input scheme are represented by the use of two 4-D keys from key matrixes displayed on a display.

A key input device and a character input method will be described in two embodiments shown in FIGS. 1 to 6 and in FIGS. 7 to 17B, respectively according to usage of 4-D keys. A detailed description will first be made of an embodiment of the key input device and the character input method using 4-D keys shown in FIGS. 1 to 6.

Figure 1:
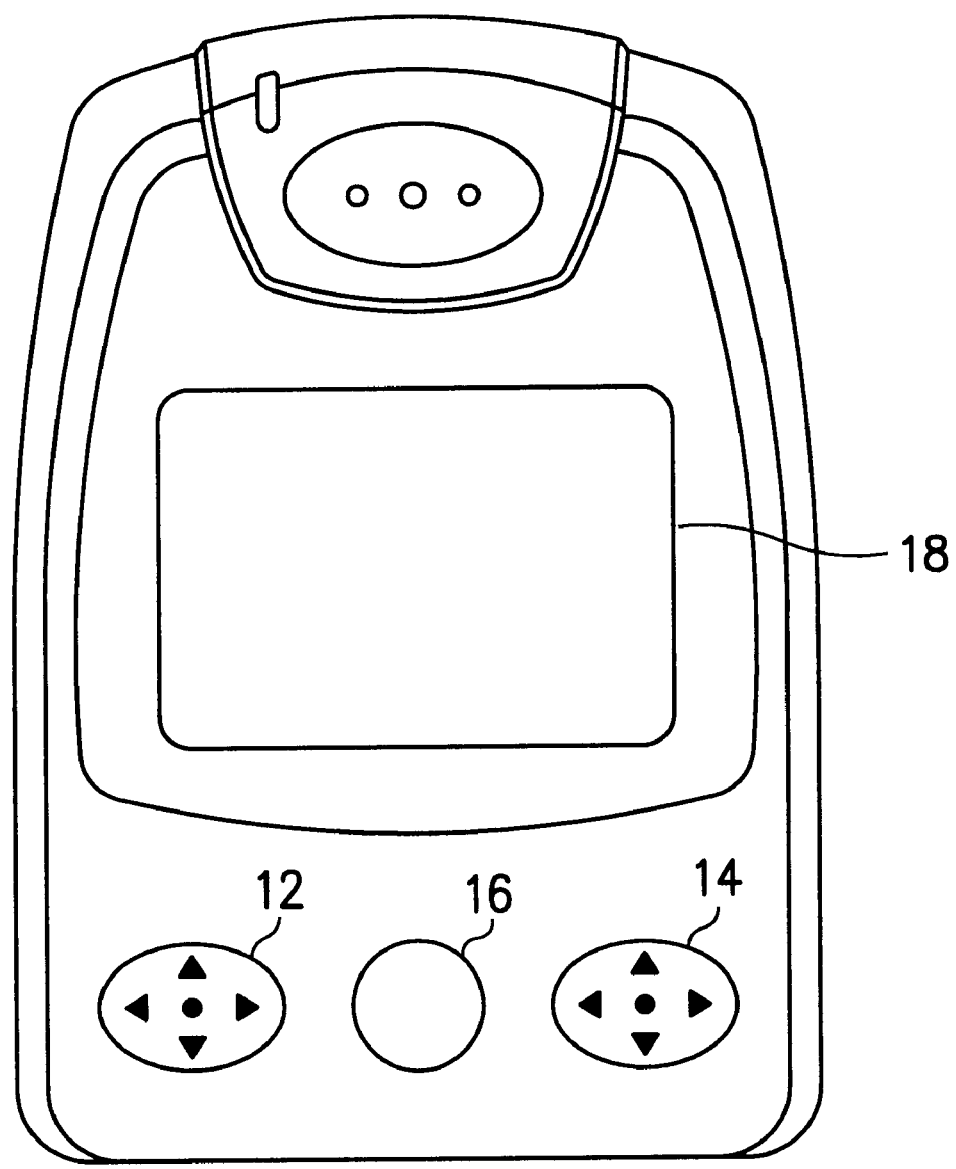
FIG. 1 is a schematic view illustrating a keypad according to a first embodiment of the present invention.
Figure 2:
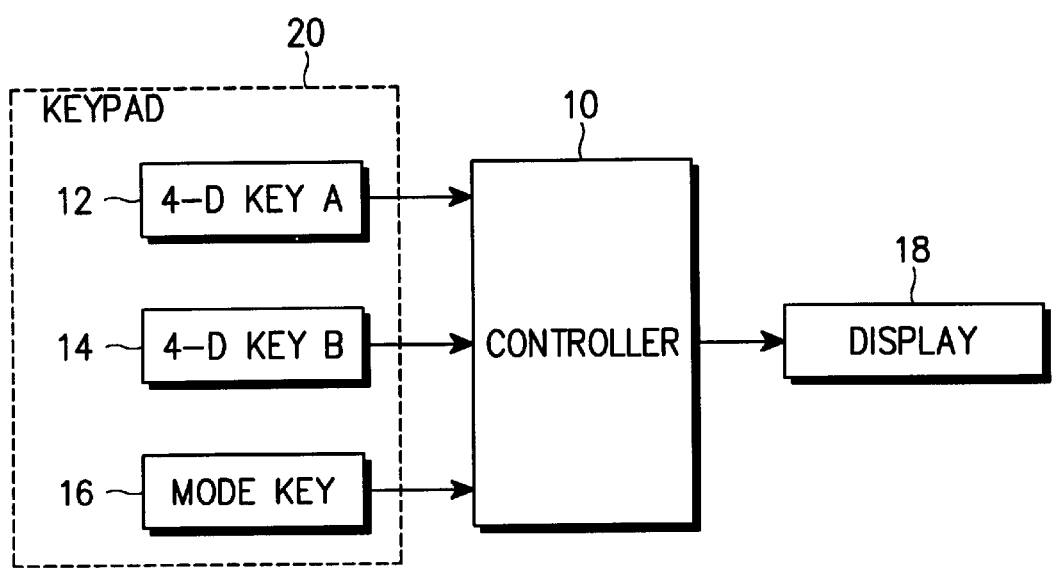
FIG. 2 is a block diagram of a mobile radio terminal according to the first embodiment of the present invention.

FIG. 1 is a schematic view of a keypad according to a first embodiment of the present invention. The keypad includes a 4-D key A 12, a mode key 16, and a 4-D key B 14. FIG. 2 is a block diagram of a mobile radio terminal according to the first embodiment of the present invention. Referring to FIG. 2, the mobile radio terminal is comprised of a controller 10, a keypad 20, and a display 18. The keypad 20 includes the 4-D key A 12, the 4-D key B 14, and the mode key 16. According to how many times the mode key 16 is pressed, the controller 10 displays a key matrix in a corresponding mode on the display 18. In the embodiment of the present invention, a digit mode, a Korean mode, an English capital mode, an English small mode, and a special mode are sequentially set as the number of pressings of the mode key 16 increases, by way of example.

Figure 3A:
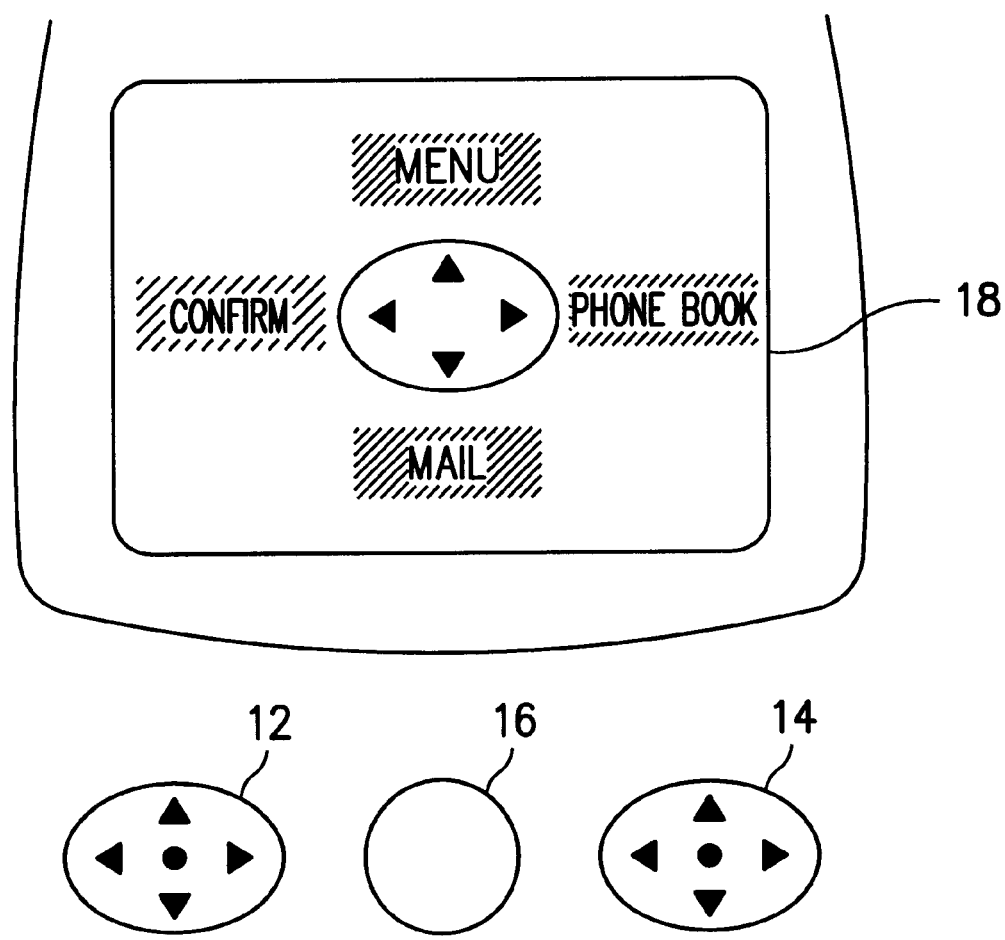
FIG. 3A illustrates function options that can be set utilizing a 4-directional navigation key A (4-D key A) according to the first embodiment of the present invention.

FIG. 3A illustrates function options that can be set by use of the 4-D key A 12 according to the first embodiment of the present invention. Before the mode key 16 is pressed, the 4-D key A 12 acts to invoke the functions of a menu, confirm, a phone book, and mail. When the 4-D key A 12 is pressed without inputting the mode key 16, the controller 10 displays a function option on the display 18 according to the pressed direction of the 4-D key A 12, as shown in FIG. 3A.

Figure 3B:
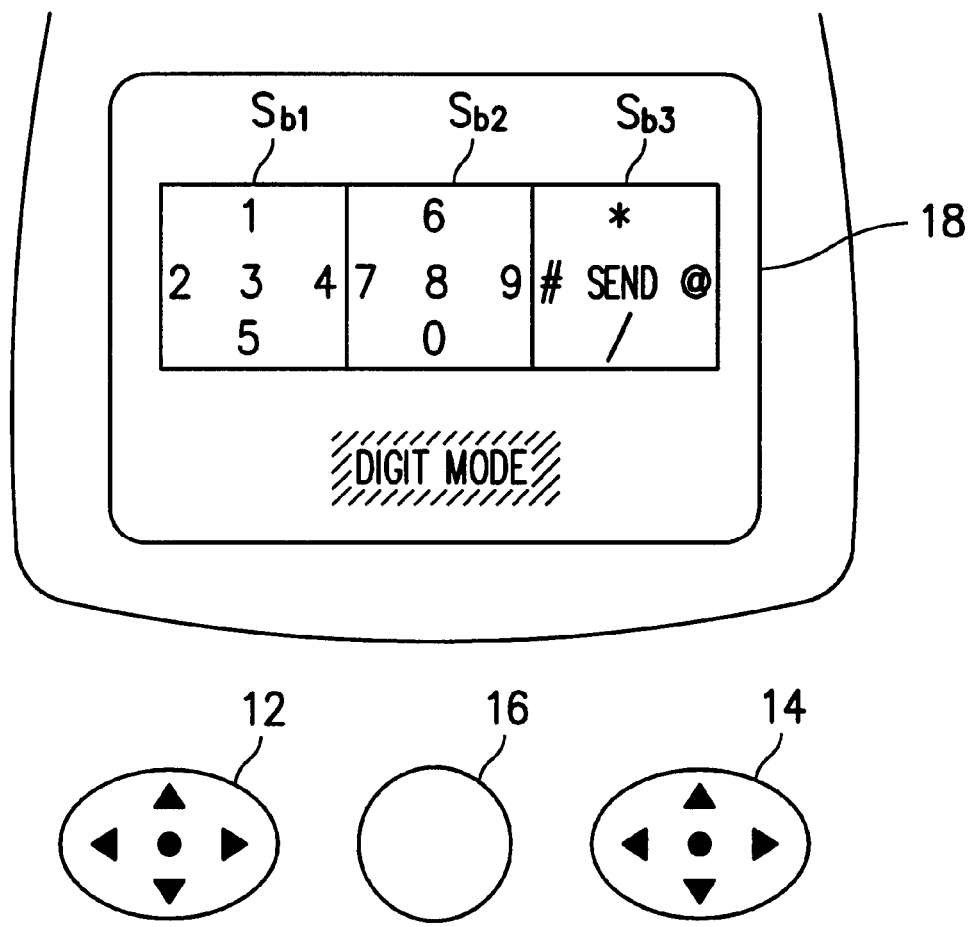
FIG. 3B illustrates a key matrix for a digit mode according to the first embodiment of the present invention.

FIG. 3B illustrates a key matrix for a digit mode according to the first embodiment of the present invention. When the mode key 16 is pressed once, the controller 10 displays the key matrix specific to the digit mode on the display 18 as shown in FIG. 3B.

Figure 3C:
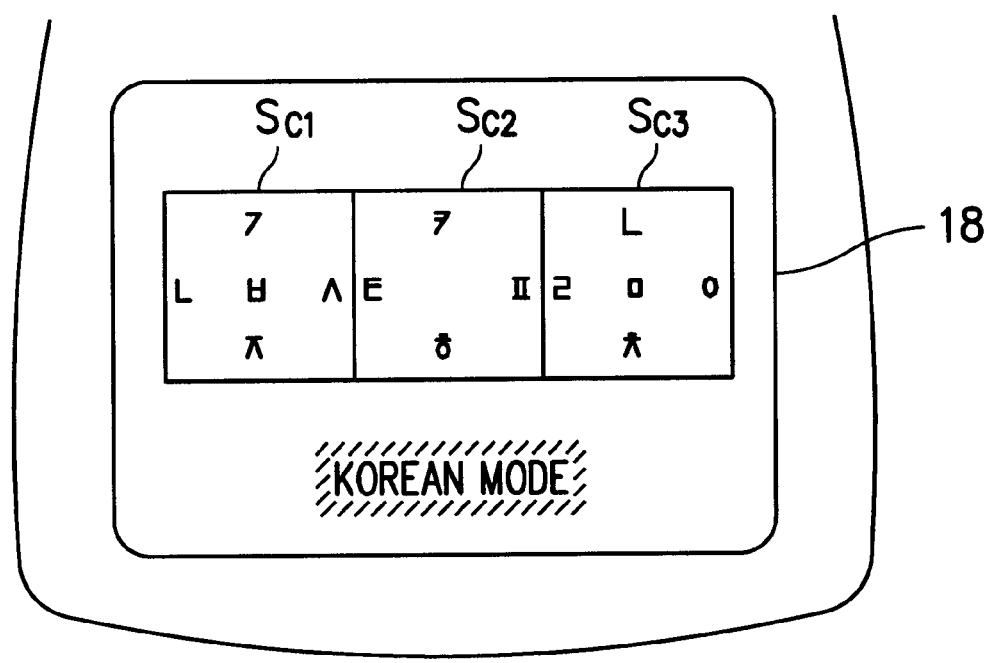
FIG. 3C illustrates a key matrix for a Korean alphabet mode (hereinafter, referred to as a Korean mode) according to the first embodiment of the present invention.

FIG. 3C illustrates a key matrix for a Korean mode according to the first embodiment of the present invention. When the mode key 16 is pressed twice, the controller 10 displays the key matrix specific to the Korean mode on the display 18 as shown in FIG. 3C.

Figure 3D:
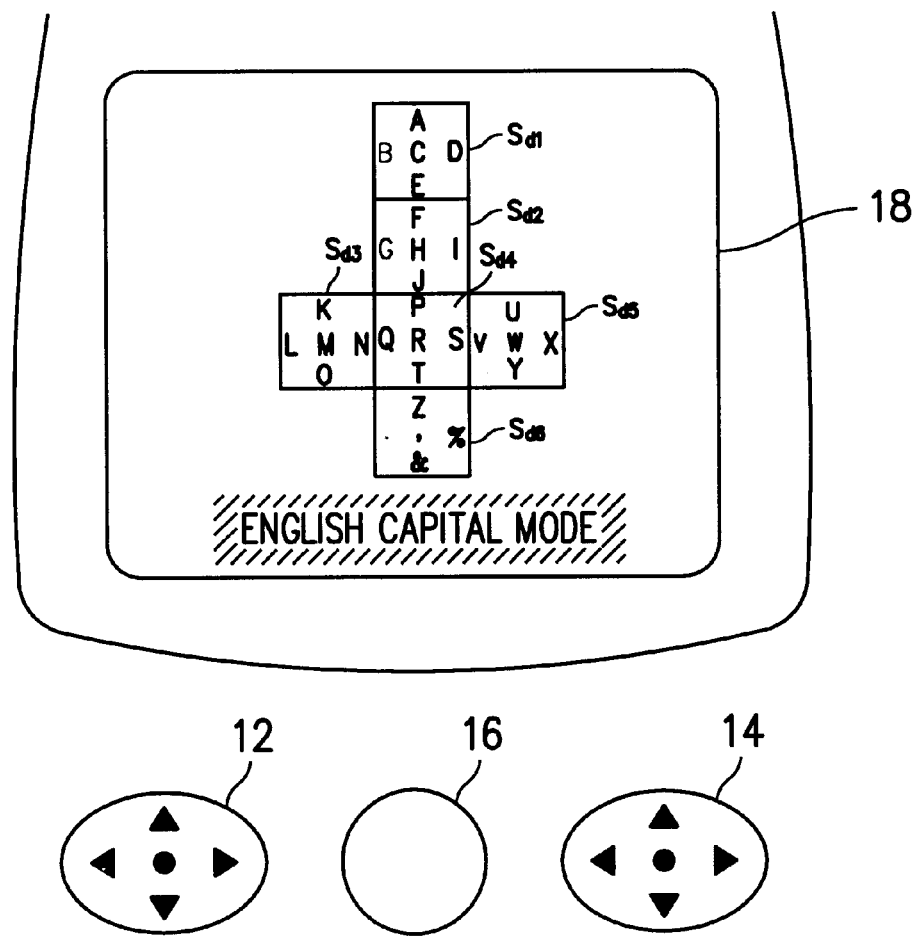
FIG. 3D illustrates a key matrix for an English capital letter mode (hereinafter, referred to as an English capital mode) according to the first embodiment of the present invention.

FIG. 3D illustrates a key matrix for an English capital mode according to the first embodiment of the present invention. When the mode key 16 is pressed three times, the controller 10 displays the key matrix specific to the English capital mode on the display 18 as shown in FIG. 3D.

Figure 3E:
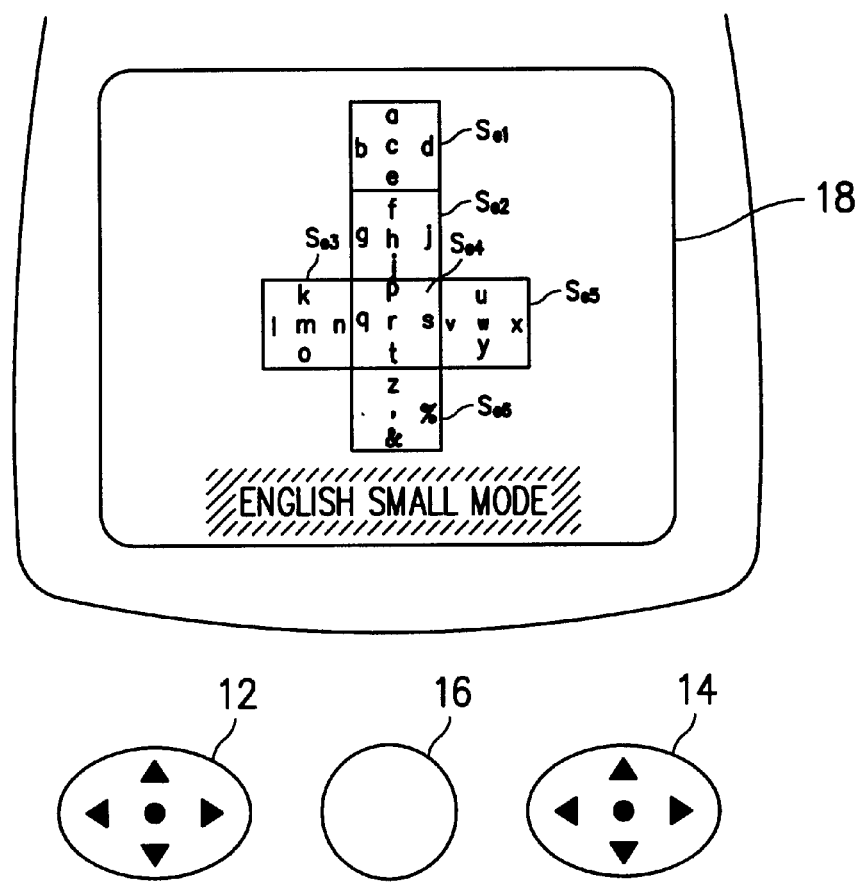
FIG. 3E illustrates a key matrix for an English small letter mode (hereinafter, referred to as an English small mode) according to the first embodiment of the present invention.

FIG. 3E illustrates a key matrix for an English small mode according to the first embodiment of the present invention. When the mode key 16 is pressed four times, the controller 10 displays the key matrix specific to the English small mode on the display 18 as shown in FIG. 3E.

Figure 3F:
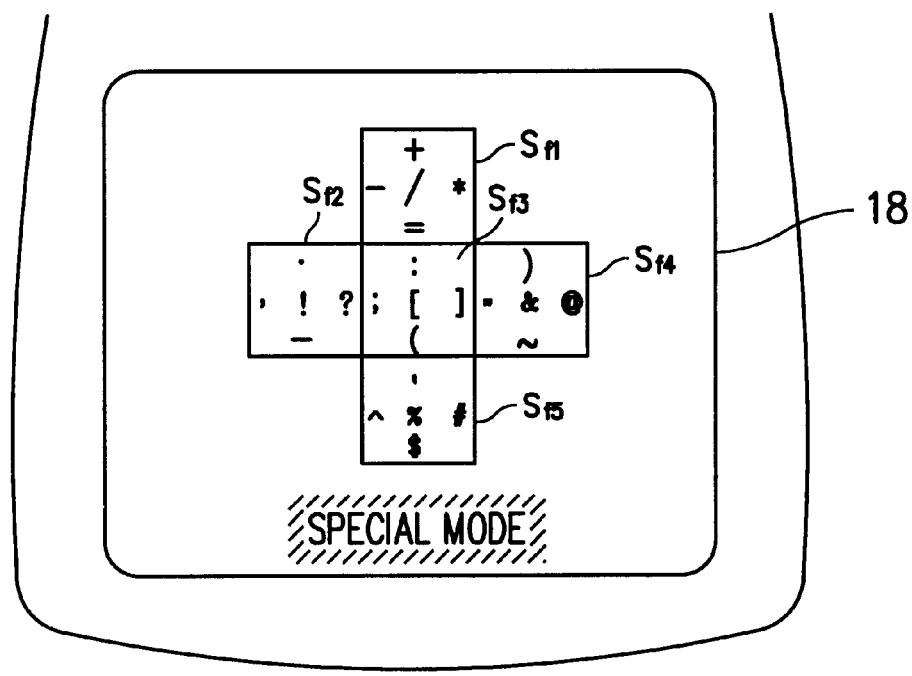
FIG. 3F illustrates a key matrix for a special character mode (hereinafter, referred to as a special mode) according to the first embodiment of the present invention.
Figure 3F:
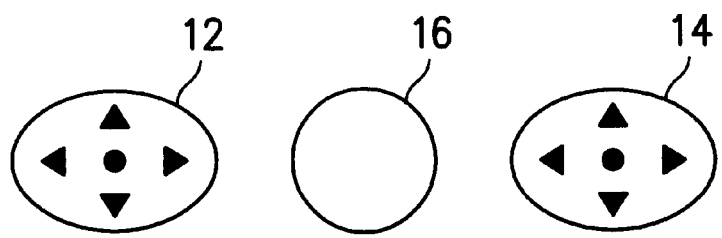

FIG. 3F illustrates a key matrix for a special mode according to the first embodiment of the present invention. When the mode key 16 is pressed five times, the controller 10 displays the key matrix specific to the special mode on the display 18 as shown in FIG. 3F.

As shown in FIGS. 3B to 3F, each key matrix is divided into three to six blocks on the display 18. Alphabet letters/characters and numerals are grouped into at least three cells in the key matrix. Each cell is assigned to elements of the key matrix in a predetermined rule in FIGS. 3B to 3F for better understanding of the present invention.

Referring to FIGS. 3B to 3F, the 4-D key A 12 is used for inter-cell movement and the 4-D key B 14 is used to select an intended digit/alphabet/symbol within a cell in each key matrix displayed on the display 18. In the Korean mode, vowels are selected relying on the scheme of "Cheon-Ji-In (●——|)" as shown below in Table 1. According to the "CHEON-JI-IN" scheme, Korean vowels are produced by the combination of three Korean alphabet characters, namely, (●——|), which are minimum elements to make the Korean vowel characters. Thus, although Korean vowels can be produced by adding two Korean characters together, Korean vowels can also be produced by only one Korean character or by adding three Korean characters together.

TABLE 1

| Pressed direction of 4-D key B | Cheon-Ji-In | remarks |
|---|---|---|
| ▲ ▼ | \| | continuously press 4-D key B |
| ● | • | press center of 4-D key B |
| ◀ ▶ | — | continuously press 4-D key B |

Figure 4:
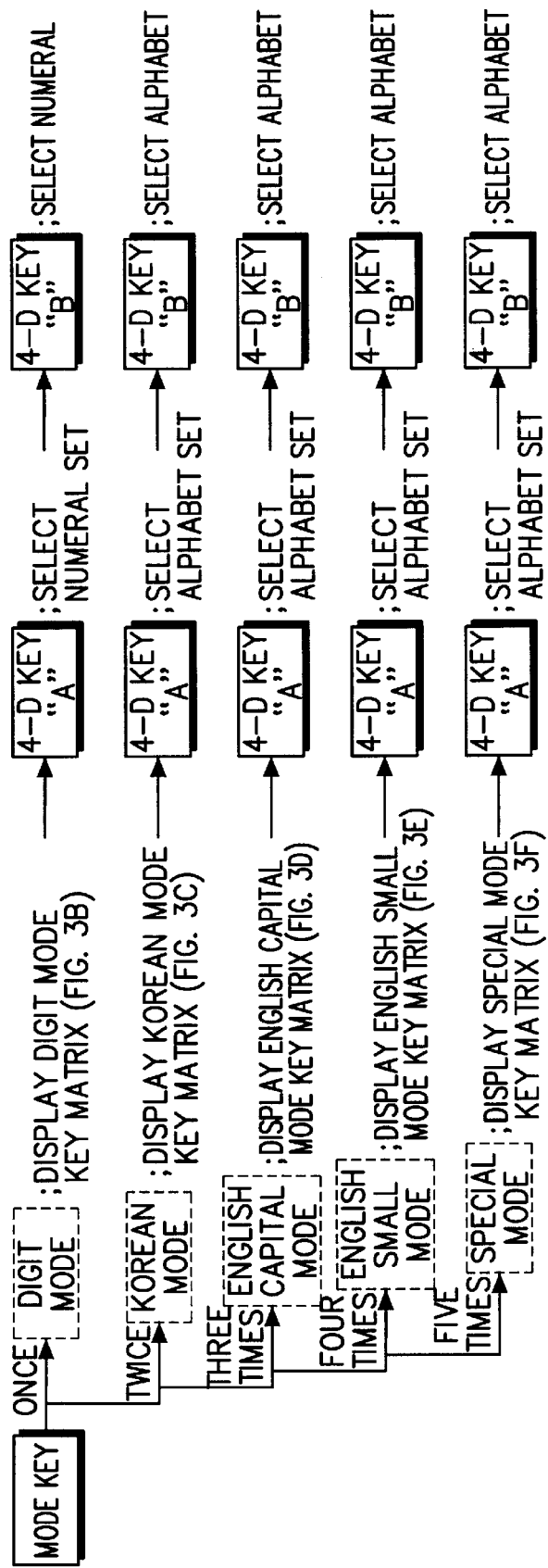
FIG. 4 illustrates a key structure and a character input method according to the first embodiment of the present invention.

FIG. 4 illustrates a key structure and a character input method according to the present invention. As shown in FIG. 4, as the number of pressings of the mode key increases, the mobile radio terminal is sequentially set to the digit mode, the Korean mode, the English capital mode, the English small mode, and the special mode in this order and their corresponding key matrixes are displayed on the display 18. The 4-D key A moves between cells and the 4-D key B selects a digit/letter/character/symbol within a cell. To move to a cell that includes an intended digit/letter/character/symbol, a user presses the 4-D key A up, down, left, or right. After a cursor is placed in the intended cell, the user presses the 4-D key B up, down, left, or right to select the intended digit/letter/character/symbol. The selected digit/letter/character/symbol is displayed in an upper part of the display 18. Then, to go to the next intended cell, the user presses the 4-D key A in a corresponding direction.

An example of inputting digits and Korean alphabet characters according to the above-described key structure and character input method will be described referring to FIGS. 5 and 6.

Figure 5:
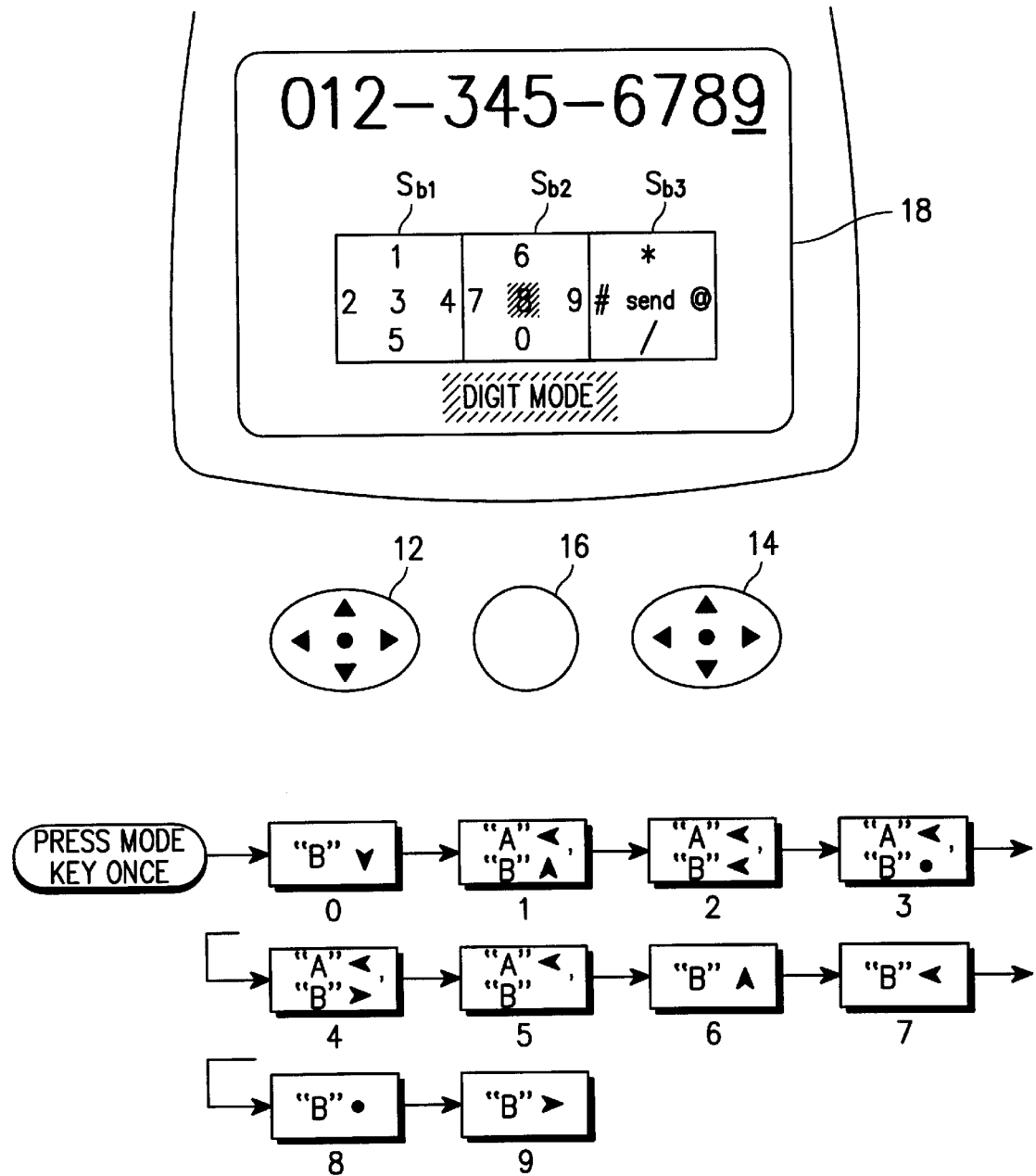
FIG. 5 illustrates a telephone number input method according to the first embodiment of the present invention.

FIG. 5 is a view illustrating a telephone number input method according to the first embodiment of the present invention. For entering a telephone number "012-345-6789", the user presses the mode key 16 once to enter the digit mode. Then, the controller 10 of FIG. 2 displays the key matrix for the digit mode on the display 18. As shown in FIG. 5, the cursor is placed over digit "8" at the center of a center cell Sb2 in the key matrix. The 4-D key A 12 and the 4-D key B 14 are denoted by A and B, respectively in the key input procedure presented in the lower part of the FIG. 5. Arrows indicate the pressed directions of the 4-D keys A and B. To enter digit "0", the user presses ▼ of the 4-D key B 14 and the controller 10 displays digit "0" on the display 18. Then to enter digit "1", the user moves the cursor to a first cell Sb1 by pressing ◀ of the 4-D key A 12. Since the cursor is positioned at the center of the first cell Sb1, the user presses ▲ of the 4-D key B 14 to select digit "1" and then the controller 10 displays digit "1" after digit "0" on the display 18. After one digit/letter/character/symbol is entered, the cursor returns to the home position. In the same manner, the other digits "3", "4", "5", "6", "7", "8", and "9" are entered.

Figure 6:
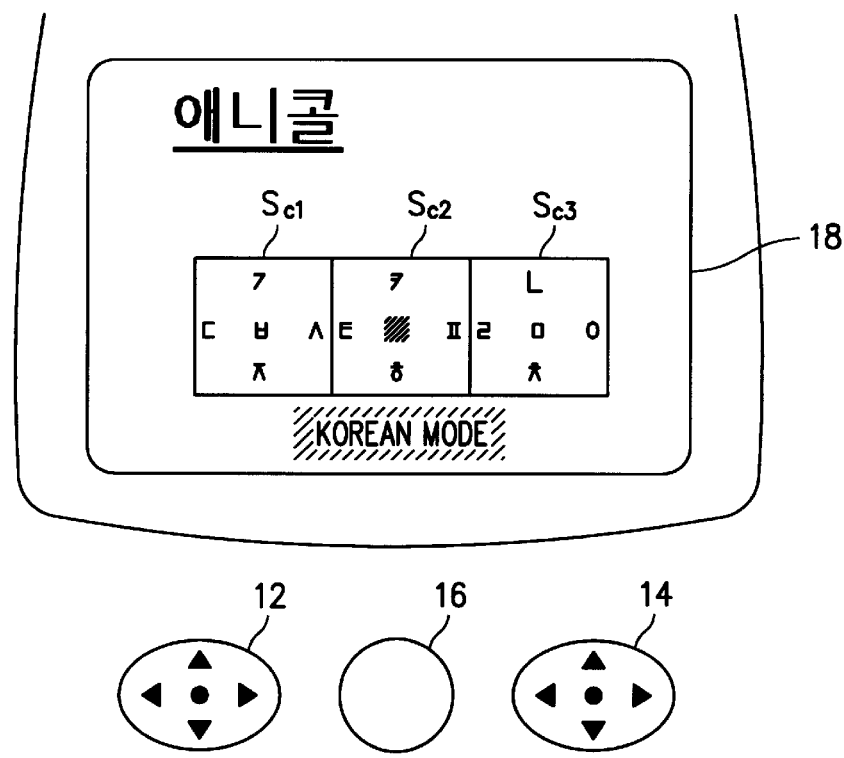
FIG. 6 illustrates a Korean alphabet input method according to the first embodiment of the present invention.
Figure 6:
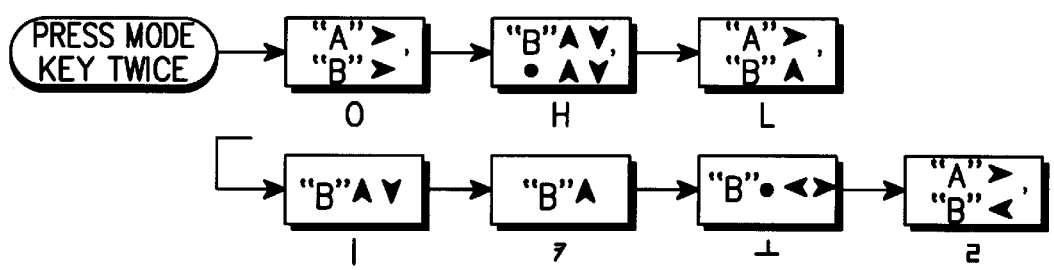

FIG. 6 illustrates a Korean alphabet character input method according to the embodiment of the present invention. For "아니요", the user presses the mode key 16 twice to set the Korean mode and the controller 10 displays the key matrix for the Korean mode on the display 18. As shown in FIG. 6, the cursor is positioned at the center of a center cell Sc2 in the key matrix. The 4-D key A 12 and the 4-D key B 14 are denoted by A and B, respectively in the key input procedure presented in the lower part of the FIG. 6. Arrows indicate the pressed directions of the 4-D keys A and B. To enter consonant "ㅇ", the cursor must move from the home position to a third cell Sc3. To do so, the user presses ▶ of the 4-D key A 12. He selects consonant "ㅇ" by pressing ▶ of the 4-D key B 14. Upon recognition of selection of "ㅇ", the controller 10 displays "ㅇ" on the display 18. For vowel "ㅏ", "|", "•", and "|" are entered by pressing ▲ & ▼, ●, and ▲ & ▼ of the 4-D key A 12. The controller 10 displays the resulting Korean alphabet "ㅏ" after "ㅇ" on the display 18. The other Korean alphabets "ㄴ", "|", "ㅓ", "ㅗ", and "ㄹ" are entered in the same manner.

A second embodiment of the key input device and the character input method using 4-D keys will now be described with reference to FIGS. 7 to 17B.

Figure 7:
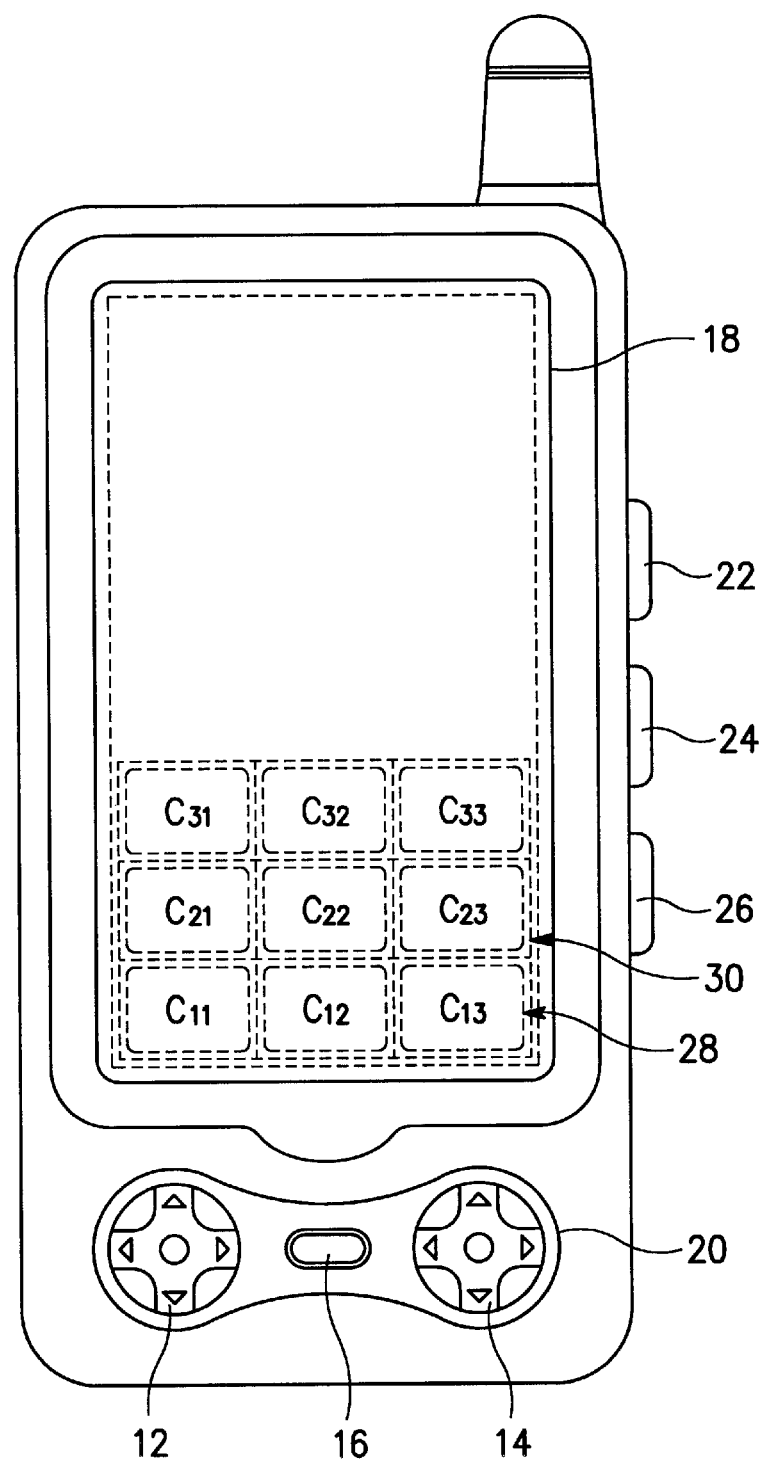
FIG. 7 is a schematic view of a keypad according to a second embodiment of the present invention.

FIG. 7 illustrates the second embodiment of the key input device according to the present invention. The key input device includes a keypad 20 with the 4-D key A 12, the 4-D key B 14, and the mode key 16, and keys "SEND" 22, "CLEAR" 24, and "END" 26 formed on a sidewall of the mobile radio terminal. The display 18 displays a key matrix 30 with cells 28, individually labeled $C_{11}$, $C_{12}$, $C_{13}$, $C_{21}$, $C_{22}$, $C_{23}$, $C_{31}$, $C_{32}$, $C_{33}$.

The controller 10 displays a key matrix 30 for a corresponding mode on the display 18 according to the number of pressings of the mode key 16. In this embodiment, the digit mode, the Korean mode, the English capital mode, and the English small mode are sequentially set as the number of pressings of the mode key 16 increases, by way of example.

Figure 8A:
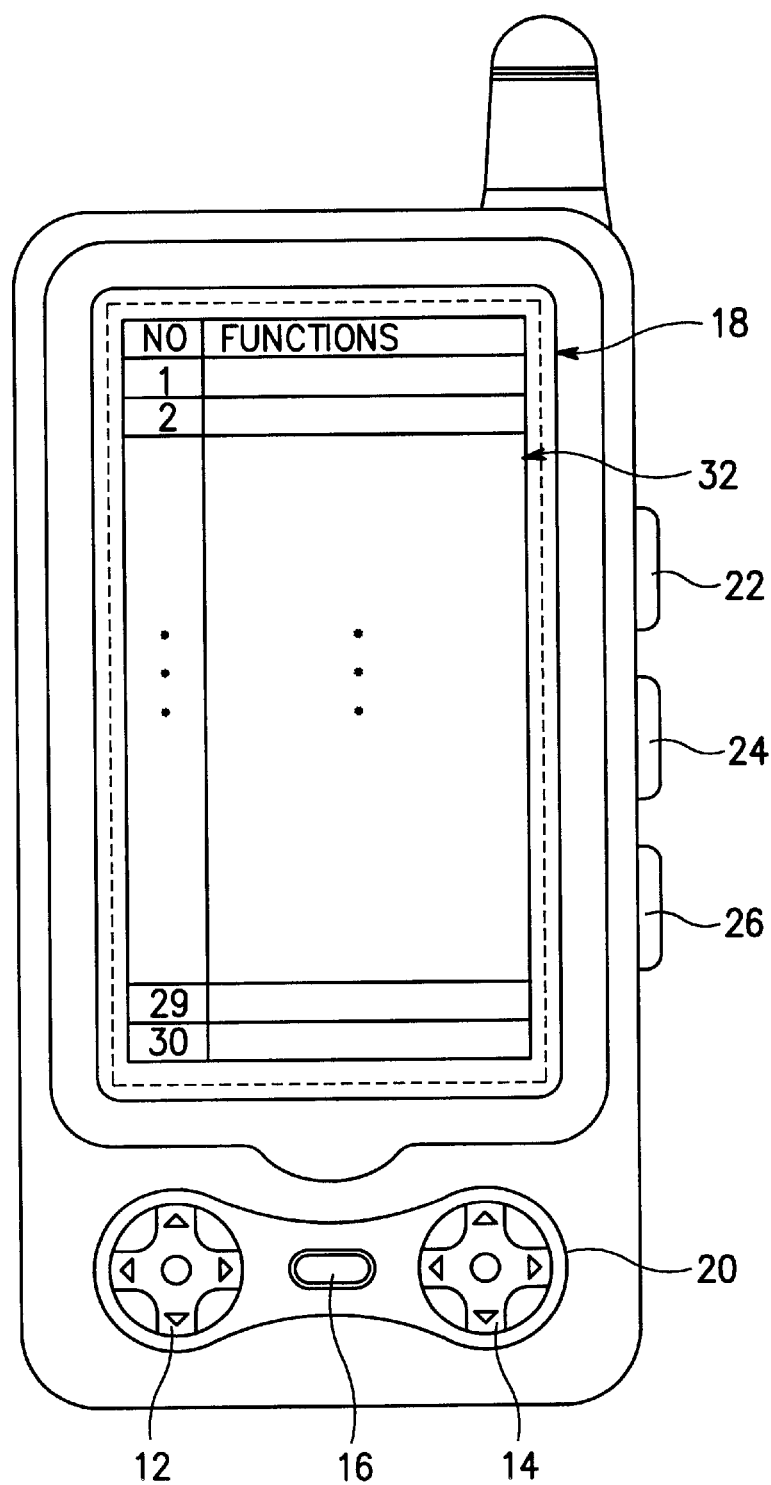
FIG. 8A illustrates a display that displays function options selectable by utilizing two 4-D keys in combination according to the second embodiment of the present invention.
Figure 8B:
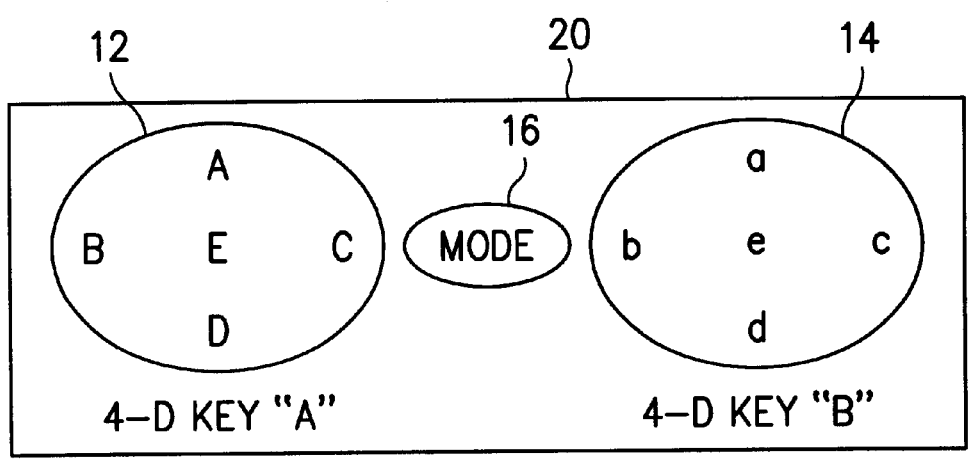
FIG. 8B illustrates the keypad including the two 4-D keys, which are utilized in combination to select function options according to the second embodiment of the present invention.
Figure 9:
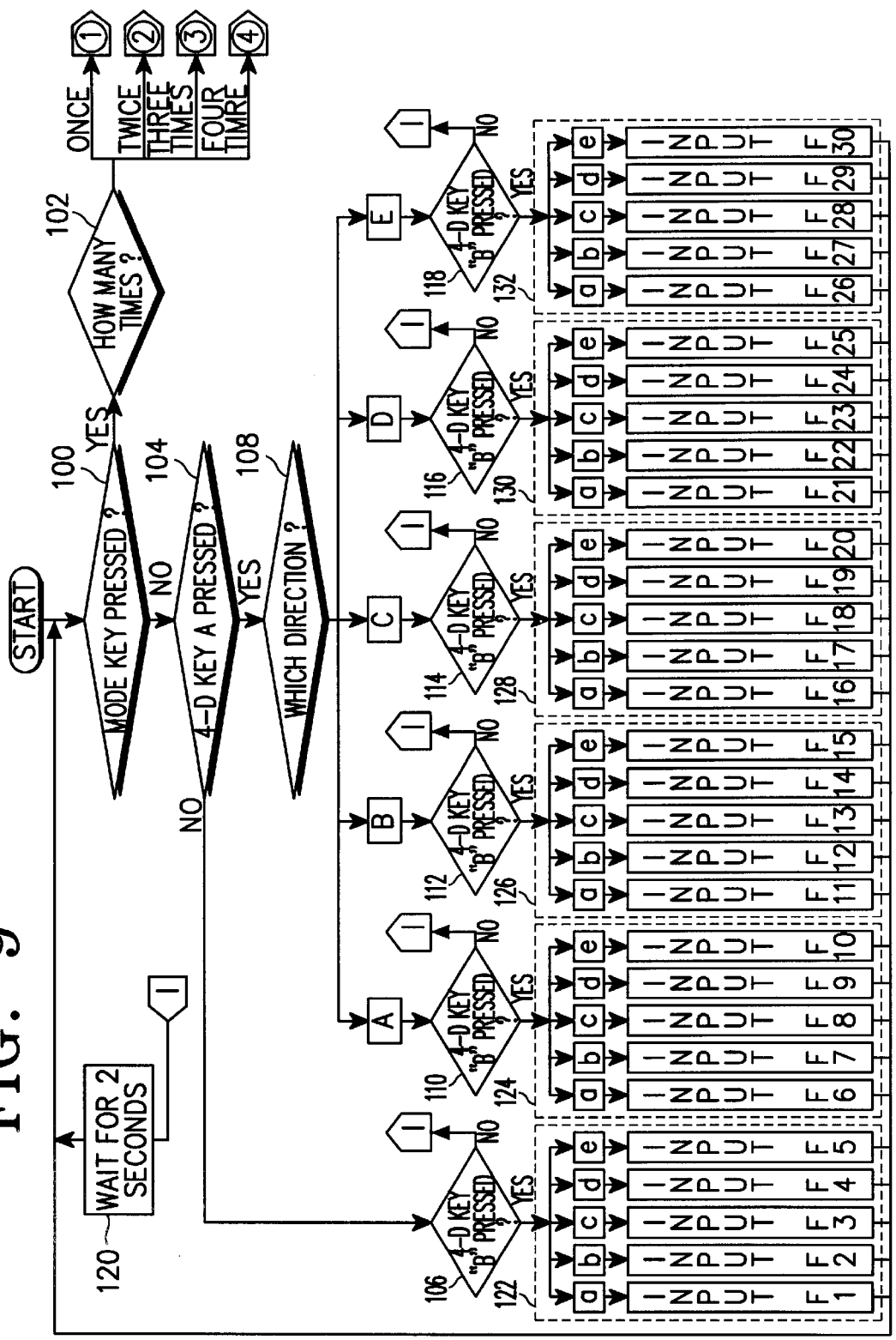
FIG. 9 is a flowchart illustrating a control operation for selecting function options utilizing the two 4-D keys according to the second embodiment of the present invention.

FIGS. 8A to 9 illustrate function keys that can be set by use of the two 4-D keys in combination without pressing the mode key 16.

FIG. 8A illustrates the display that displays function options set by utilizing the two 4-D keys in combination according to the second embodiment of the present invention. A function option list 32 is displayed on the display 18 so that the user may select an intended function option utilizing the directional navigation keys. The function option list 32 may include 25 keys that can be set by utilizing the two 4-D keys in combination and 5 keys that can be set by utilizing the 4-D key B 14 alone, thus a total of 30 functions. These function keys can be set as keys related with a phone book, mail, alarm, and etc., or hot keys.

FIG. 8B illustrates the keypad including the two 4-D keys that are used in combination to select function options. To identify the keys and directions, the directions of the 4-D key A are labeled with capital alphabet letters and those of the 4-D key B, with small alphabet letters in the second embodiment of the present invention.

FIG. 8C is a table showing 30 combinations of the two 4-D keys to set function options according to the second embodiment of the present invention.

FIG. 8D is a table illustrating the function options F1 to F30 versus combinations of the two 4-D keys according to the second embodiment of the present invention.

FIG. 9 is a flowchart illustrating a method of selecting function options utilizing the two 4-D keys according to the second embodiment of the present invention. Referring to FIG. 9, the controller 10 determines whether the user has pressed the mode key 16 in step 100 and sets the digit mode, the Korean mode, the English capital mode, or the English small mode according to how many times the mode key 16 was pressed in step 102. If the mode key 16 is not pressed in step 100, the controller 10 determines whether the 4-D key A has been pressed in step 104. If the 4-D key A was pressed, the controller 10 determines in which direction it was pressed in step 108. On the other hand, if the 4-D key A was not pressed in step 104, the controller 10 determines whether the 4-D key B has been pressed in step 106.

In step 108, the controller 10 proceeds in the pressed direction of the 4-D key A in the keypad 20 of FIG. 8B. For example, if the 4-D key A is pressed up, the controller 10 is directed to A and determines whether the 4-D key B has been pressed in step 110. If the 4-D key B was pressed, one of functions F6 to F10 is input according to the pressed direction of the 4-D key B in step 124. On the other hand, if the 4-D key B was not pressed in step 110, the controller 10 goes to step 120. In step 120, the controller 10 waits for two seconds and then returns to step 100. In the same manner, the other functions are input according to the pressed directions of the 4-D keys A and B.

If the controller 10 determines that only the 4-D key B has been pressed in steps 104 and 106, it inputs one of functions F1 to F5 according to the pressed direction of the 4-D key B in step 122.

Figure 10A:
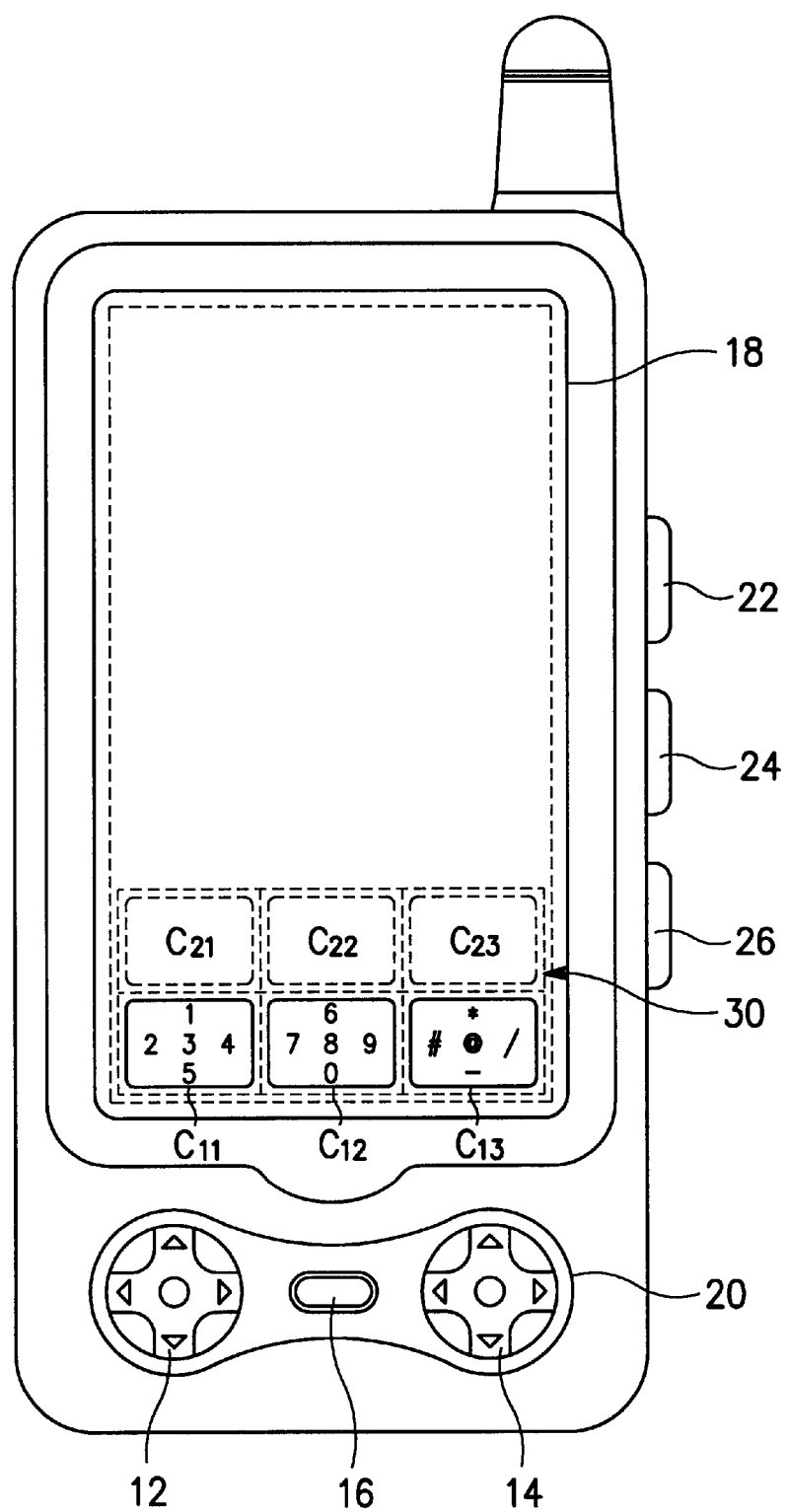
FIG. 10A illustrates a key matrix for a digit mode according to the second embodiment of the present invention.
Figure 10B:
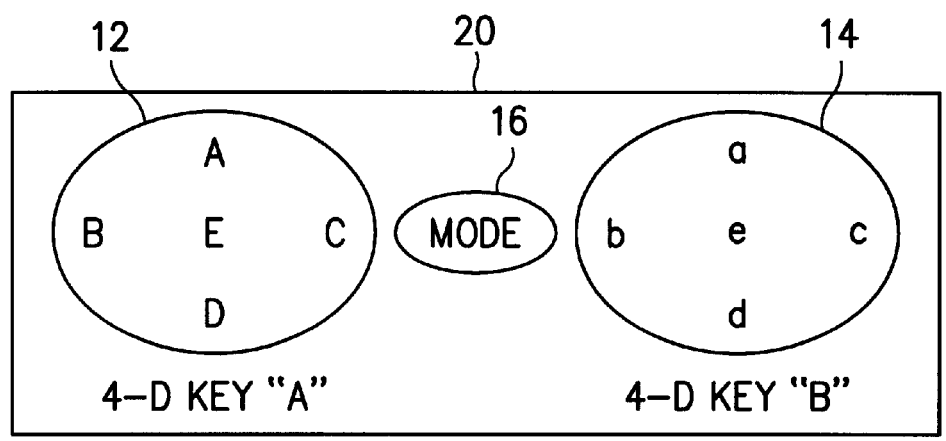
FIG. 10B illustrates the keypad including the two 4-D keys for inputting digits in the digit mode according to the second embodiment of the present invention.
Figure 11:
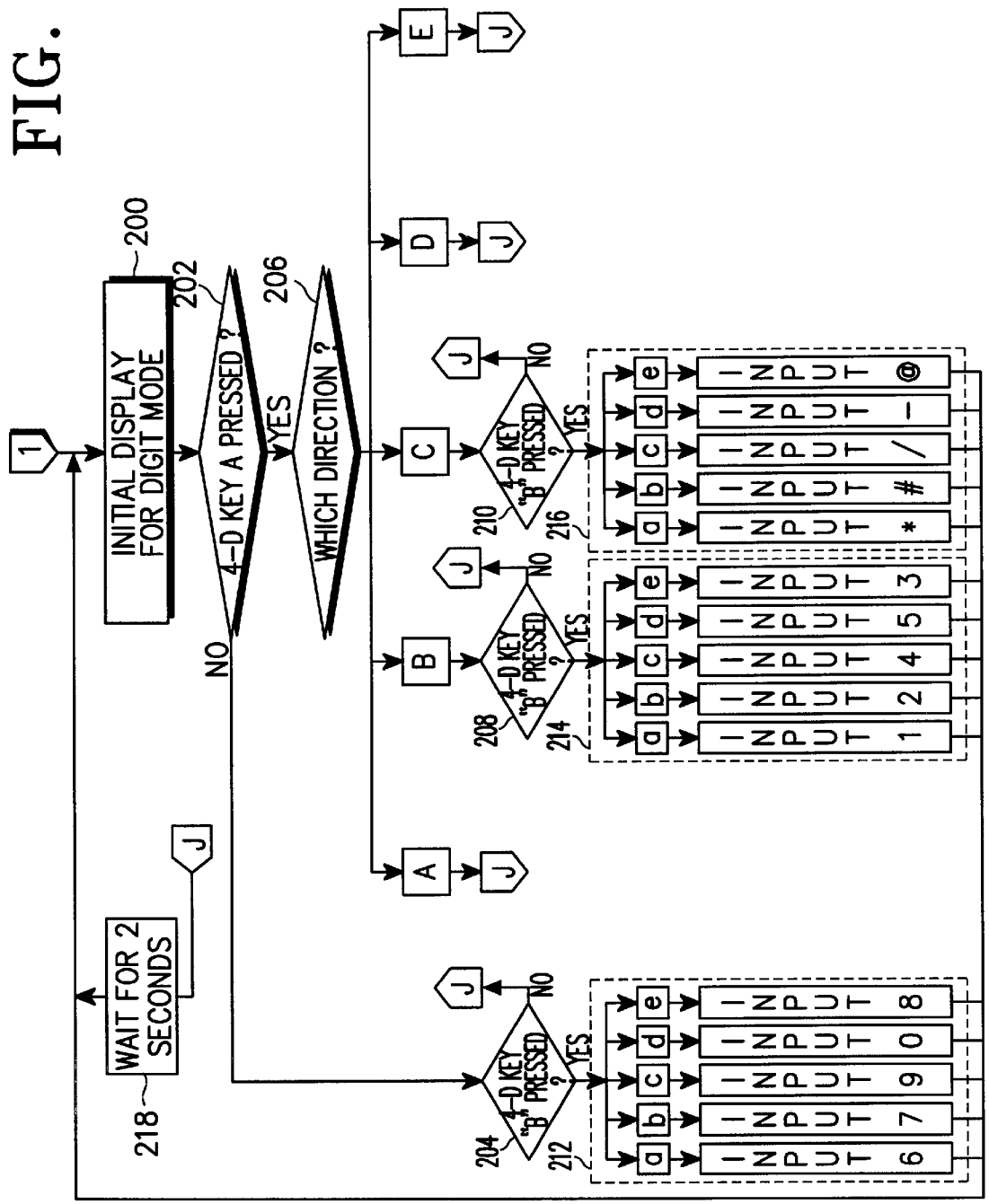
FIG. 11 is a flowchart illustrating a method of selecting digits utilizing the two 4-D keys in the digit mode according to the second embodiment of the present invention.

FIGS. 10A to 11 illustrate input of digits by combining the two 4-D keys in the digit mode when the mode key 16 is pressed once.

FIG. 10A illustrates the display 18 with a key matrix for the digit mode according to the second embodiment of the present invention. The key matrix 30 with cells of digits and symbols $C_{11}$, $C_{12}$, $C_{13}$ is displayed on the display 18. A digit/symbol can be selected by using the two 4-D keys in combination.

FIG. 10B illustrates the keypad including the two 4-D keys which are used in combination to input digits in the digit mode according to the second embodiment of the present invention. To identify the keys and directions, the directions of the 4-D key A are labeled with capital alphabet letters and those of the 4-D key B, with small alphabet letters in the second embodiment of the present invention.

FIG. 10C is a table showing 30 combinations of the two 4-D keys to set digits/symbols according to the second embodiment of the present invention.

FIG. 10D is a table illustrating the digits/symbols versus combinations of the two 4-D keys in the digit mode according to the second embodiment of the present invention. Key combinations by which no digits/symbols are set can be reserved for later needs.

FIG. 11 is a flowchart illustrating a method of inputting the two 4-D keys to select digits/symbols in the digit mode according to the second embodiment of the present invention. Referring to FIG. 11, the controller 10 sets the digit mode when the mode key 16 is pressed once in step 102 of FIG. 9. In step 200 of FIG. 11, the controller 10 provides an initial display for the digit mode as shown in FIG. 10A. In step 202, the controller 10 determines whether the 4-D key A has been pressed. If the 4-D key A was pressed, the controller 10 determines in which direction it was pressed in step 206. On the other hand, if the 4-D key A was not pressed in step 202, the controller 10 determines whether the 4-D key B has been pressed in step 204.

In step 206, the controller 10 proceeds in the pressed direction of the 4-D key A in the keypad 20 of FIG. 10B. For example, if the 4-D key A is pressed left, the controller 10 is directed to B and determines whether the 4-D key B has been pressed in step 208. If the 4-D key B was pressed, one of digits 1 to 5 is input according to the pressed direction of the 4-D key B in step 214. On the other hand, if the 4-D key B was not pressed in step 208, the controller 10 goes to step 218. In step 218, the controller 10 waits for two seconds and then returns to step 200. In the same manner, the other digits/symbols are input according to the pressed directions of the 4-D keys A and B.

If the controller 10 determines that only the 4-D key B has been pressed in steps 202 and 204, it inputs one of 0 and 6 to 9 according to the pressed direction of the 4-D key B in step 212.

Figure 12A:
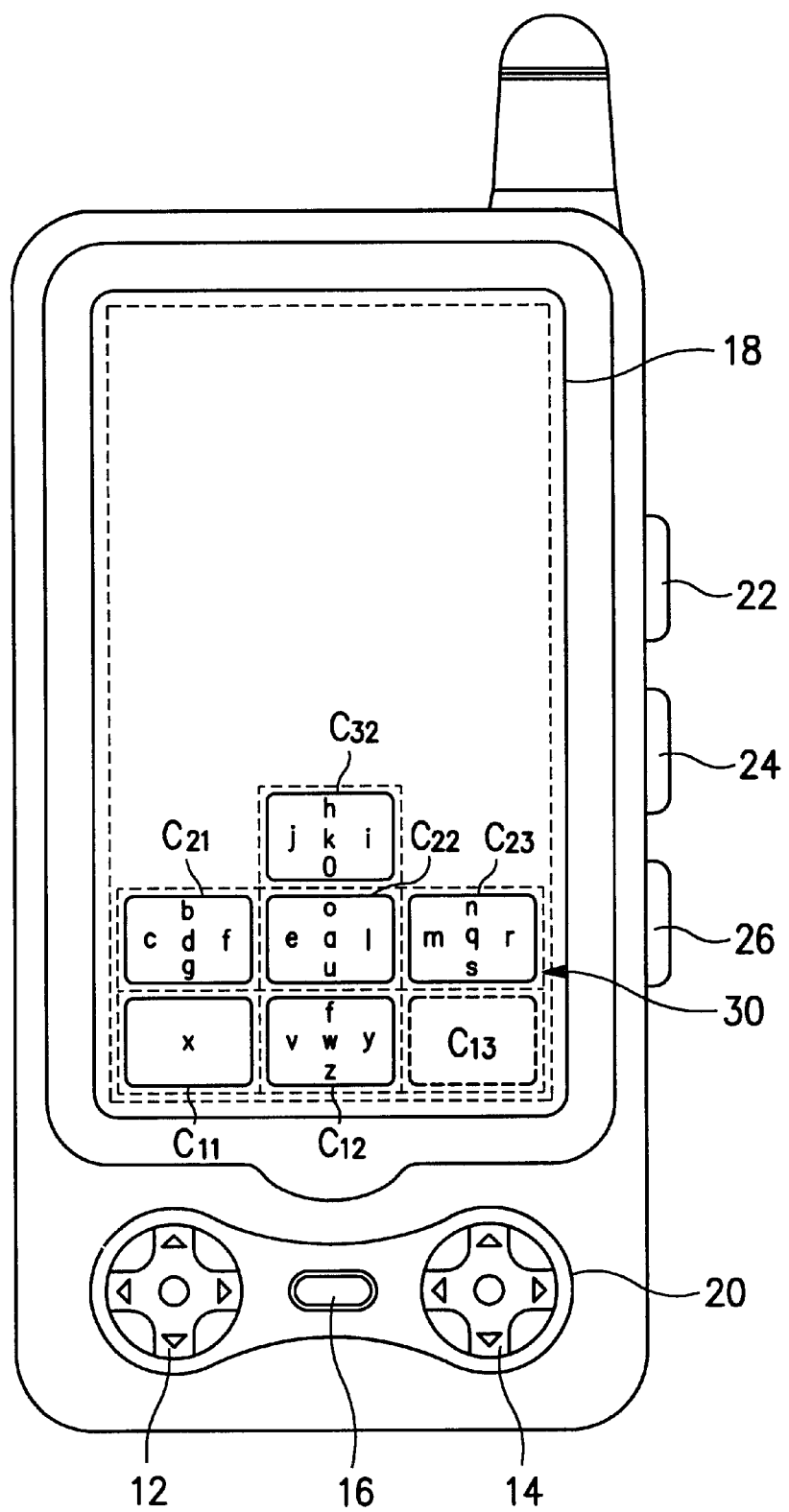
FIG. 12A illustrates a key matrix for an English small mode according to the second embodiment of the present invention.
Figure 12B:
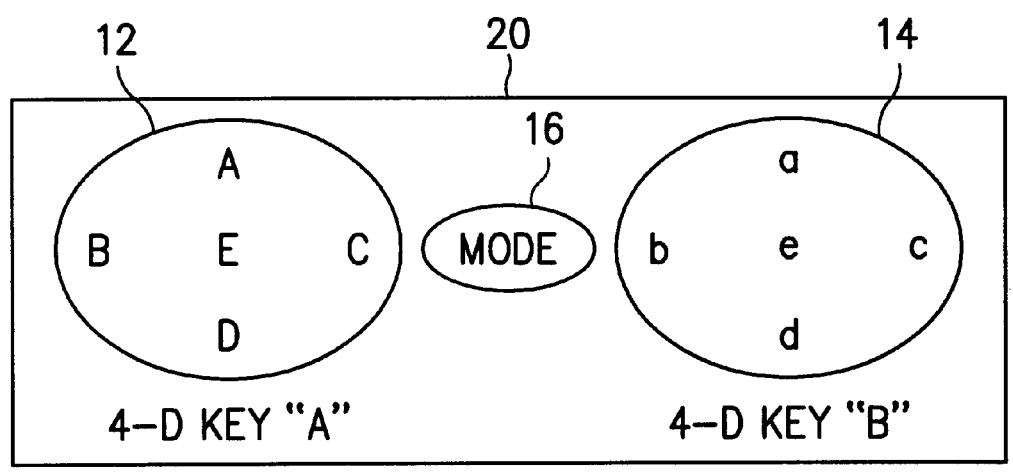
FIG. 12B illustrates the keypad including the two 4-D keys for inputting English small alphabet letters in the English small mode according to the second embodiment of the present invention.
Figure 13:
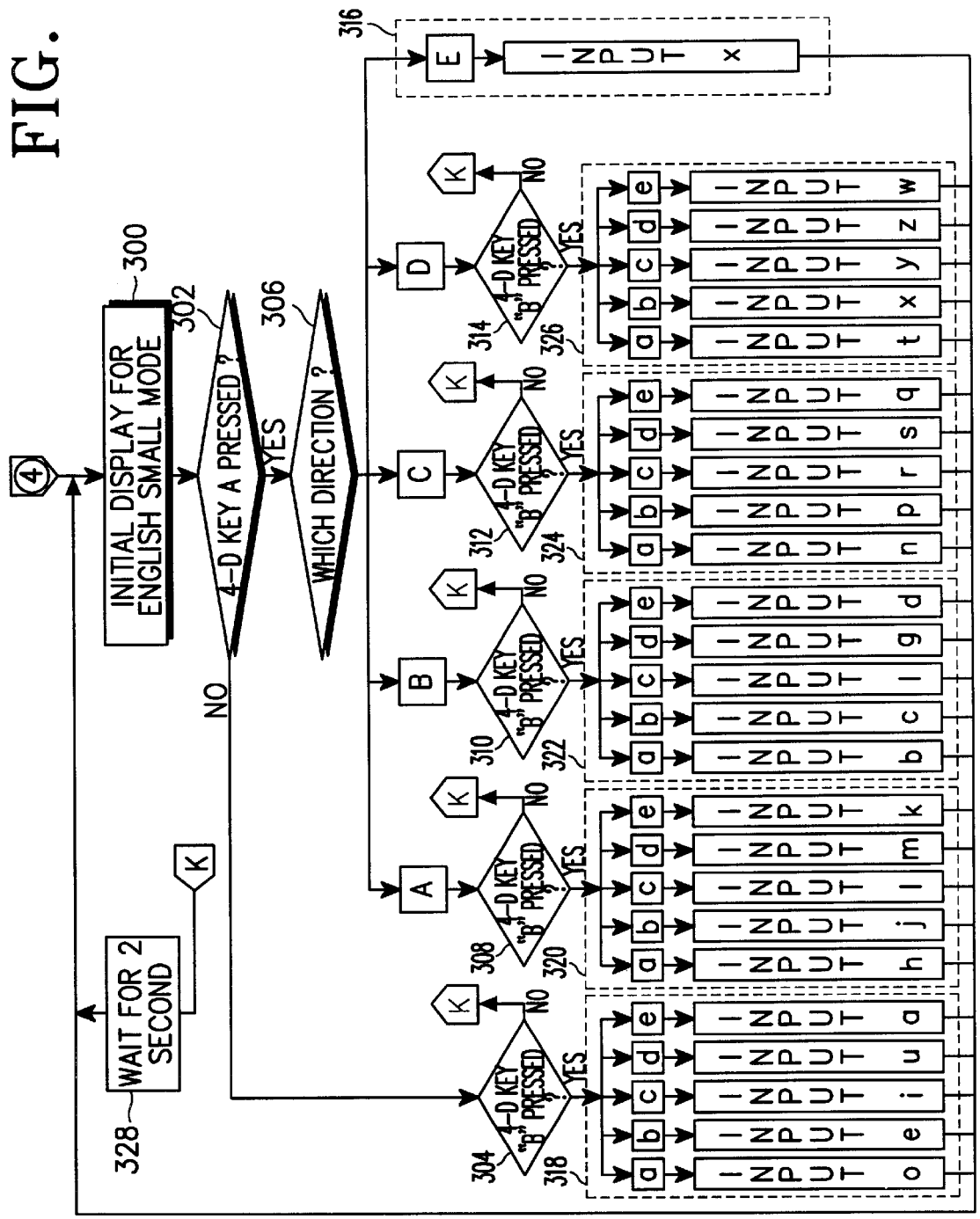
FIG. 13 is a flowchart illustrating a method of selecting English small alphabet letters utilizing the two 4-D keys in the English small mode according to the second embodiment of the present invention.

FIGS. 12A to 13 illustrate input of English small letters by combining the two 4-D keys in the English small mode when the mode key 16 is pressed four times.

FIG. 12A illustrates the display 18 with a key matrix for the English small mode according to the second embodiment of the present invention. The key matrix 30 with cells of small alphabet letters $C_{11}$, $C_{12}$, $C_{21}$, $C_{22}$, $C_{23}$, $C_{32}$ is displayed on the display 18. A small alphabet letter can be selected by using the two 4-D keys in combination. Frequently used vowels a, e, i, o, u are collected in the center cell $C_{22}$ so as to increase convenience in inputting keys and minimize unnecessary key inputs.

FIG. 12B illustrates the keypad including the two 4-D keys which are used in combination to input small alphabet letter in the English small mode according to the second embodiment of the present invention. To identify the keys and directions, the directions of the 4-D key A are labeled with capital alphabets and those of the 4-D key B, with small alphabets in the second embodiment of the present invention.

FIG. 12C is a table showing 30 combinations of the two 4-D keys to set small alphabet letters in the English small mode according to the second embodiment of the present invention.

FIG. 12D is a table illustrating the English small alphabet letters versus combinations of the two 4-D keys in the English small mode according to the second embodiment of the present invention. Small alphabet letter "x" is input when the center of the 4-D key A is pressed, thereby minimizing the number of unnecessary key inputs.

FIG. 13 is a flowchart illustrating a method of selecting English small alphabet letters using the two 4-D keys in the English small mode according to the second embodiment of the present invention. Referring to FIG. 13, the controller 10 sets the English small mode when the mode key 16 is pressed four times in step 102 of FIG. 9. In step 300 of FIG. 13, the controller 10 provides an initial display for the English small mode as shown in FIG. 12A. In step 302, the controller 10 determines whether the 4-D key A has been pressed. If the 4-D key A was pressed, the controller 10 determines in which direction it was pressed in step 306. On the other hand, if the 4-D key A was not pressed in step 302, the controller 10 determines whether the 4-D key B has been pressed in step 304.

In step 306, the controller 10 proceeds in the pressed direction of the 4-D key A in the keypad 20 of FIG. 12B. For example, if the 4-D key A is pressed up, the controller 10 is directed to A and determines whether the 4-D key B has been pressed in step 308. If the 4-D key B was pressed, one of h, j, l, m, k is input according to the pressed direction of the 4-D key B in step 320. On the other hand, if the 4-D key B was not pressed in step 308, the controller 10 goes to step 328. In step 328, the controller 10 waits for two seconds and then returns to step 300. In the same manner, the other small alphabet letters are input according to the directions of the 4-D keys A and B.

If the controller 10 determines that only the 4-D key B has been pressed in steps 302 and 304, it inputs one of o, e, i, u, a according to the pressed direction of the 4-D key B in step 318.

Figure 14A:
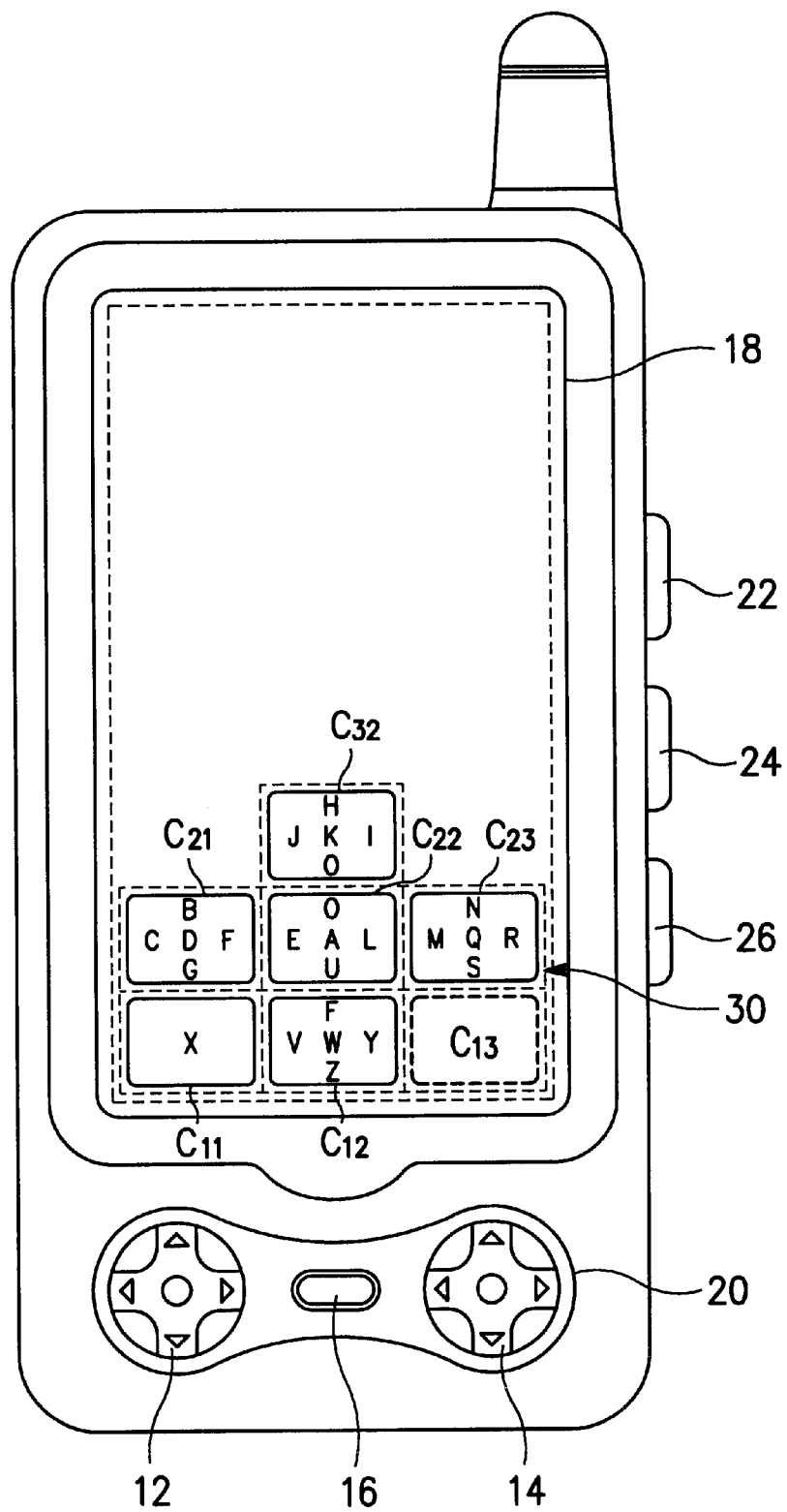
FIG. 14A illustrates a key matrix for an English capital mode according to the second embodiment of the present invention.
Figure 14B:
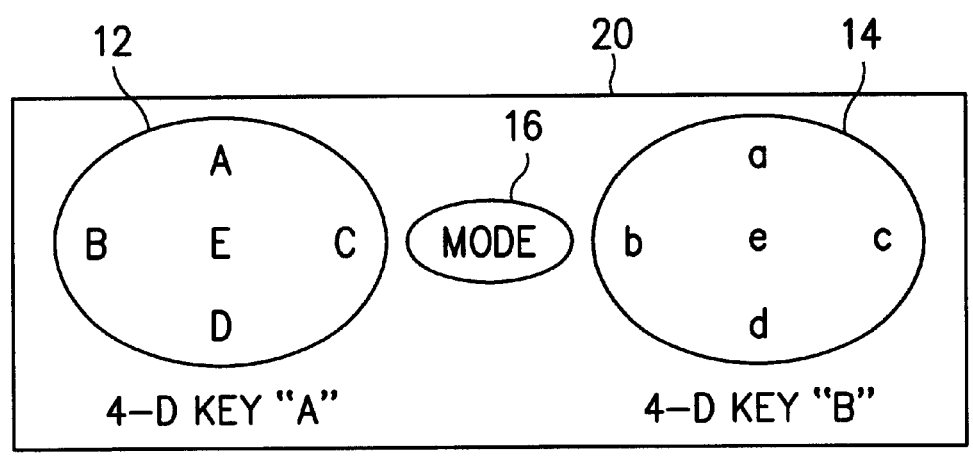
FIG. 14B illustrates the keypad including the two 4-D keys for inputting English capital alphabet letters in the English capital mode according to the second embodiment of the present invention.
Figure 15:
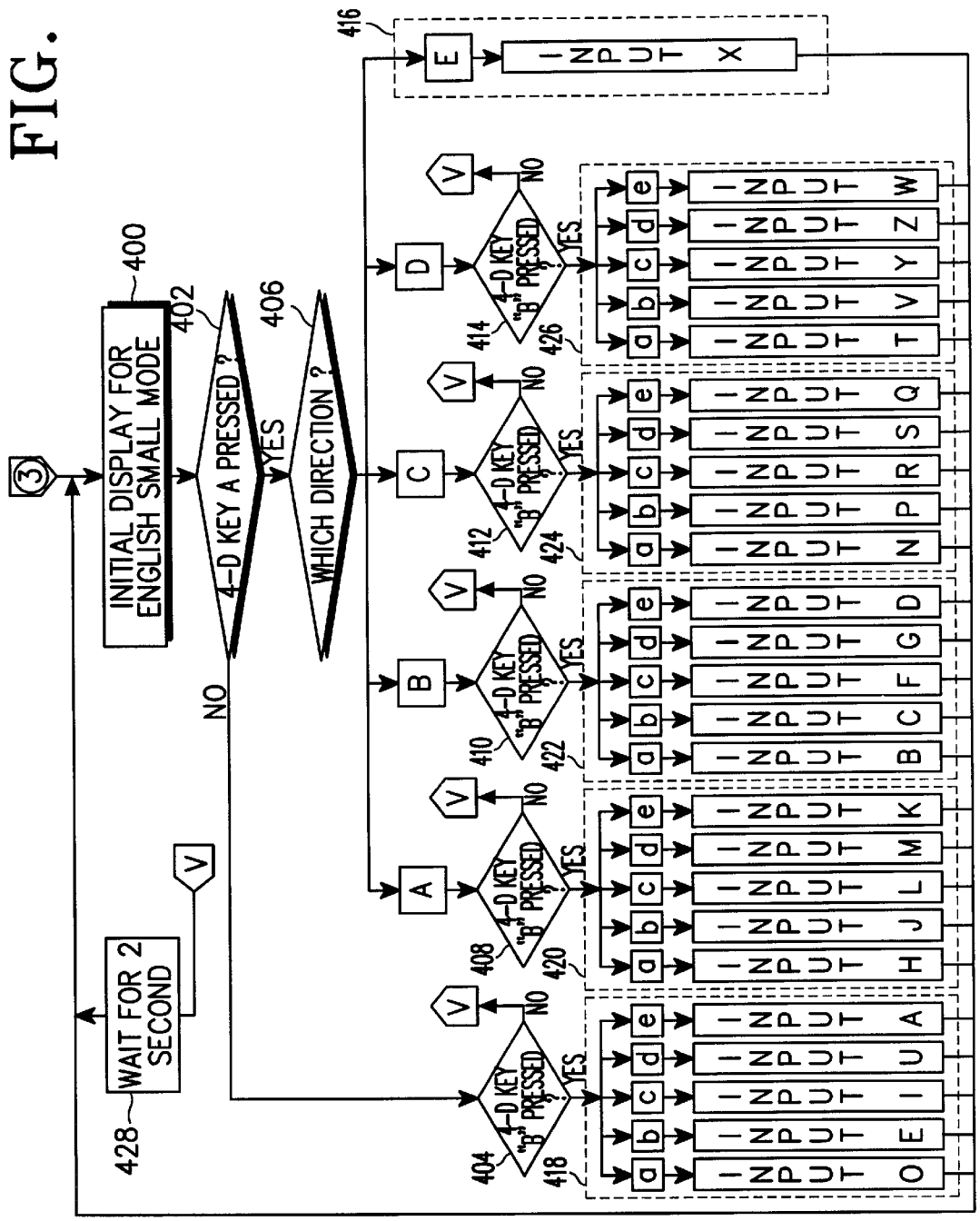
FIG. 15 is a flowchart illustrating a method of selecting English capital alphabet letters utilizing the two 4-D keys in the English capital mode according to the second embodiment of the present invention.

FIGS. 14A to 15 illustrate input of English capital letters by combining the two 4-D keys in the English capital mode when the mode key 16 is pressed three times.

FIG. 14A illustrates the display 18 with a key matrix for the English capital mode according to the second embodiment of the present invention. The key matrix 30 with cells of capital alphabet letters $C_{11}$, $C_{12}$, $C_{21}$, $C_{22}$, $C_{23}$, $C_{32}$ is displayed on the display 18. An English capital letter can be selected by using the two 4-D keys in combination. Frequently used vowels A, E, I, O, U are collected in the center cell $C_{22}$ so as to increase convenience in inputting keys and minimize unnecessary key inputs.

FIG. 14B illustrates the keypad including the two 4-D keys which are used in combination to input English capital letters in the English capital mode according to the second embodiment of the present invention. To identify the keys and directions, the directions of the 4-D key A are labeled with capital alphabet letters and those of the 4-D key B, with small alphabet letters in the second embodiment of the present invention.

FIG. 14C is a table showing 30 combinations of the two 4-D keys to set English capital letters in the English capital mode according to the second embodiment of the present invention.

FIG. 14D is a table illustrating the English capital letters versus combinations of the two 4-D keys in the English capital mode according to the second embodiment of the present invention. Capital alphabet letter "X" is input when the center of the 4-D key A is pressed so as to minimize the number of unnecessary key inputs.

FIG. 15 is a flowchart illustrating a method of selecting English capital letters using the two 4-D keys in the English capital mode according to the second embodiment of the present invention. Referring to FIG. 15, the controller 10 sets the English capital mode when the mode key 16 is pressed three times in step 102 of FIG. 9. In step 400 of FIG. 15, the controller 10 provides an initial display for the English capital mode as shown in FIG. 14A. In step 402, the controller 10 determines whether the 4-D key A has been pressed. If the 4-D key A was pressed, the controller 10 determines in which direction it was pressed in step 406. On the other hand, if the 4-D key A was not pressed in step 402, the controller 10 determines whether the 4-D key B has been pressed in step 404.

In step 406, the controller 10 proceeds in the pressed direction of the 4-D key A in the keypad 20 of FIG. 14B. For example, if the 4-D key A is pressed up, the controller 10 is directed to A and determines whether the 4-D key B has been pressed in step 408. If the 4-D key B was pressed, one of H, J, L, M, K is input according to the pressed direction of the 4-D key B in step 420. On the other hand, if the 4-D key B was not pressed in step 408, the controller 10 goes to step 428. In step 428, the controller 10 waits for two seconds and then returns to step 400. Upon input of the 4-D key A in the direction E in step 406, the controller 10 inputs capital "X" as shown in FIG. 14D. In the same manner, the other English capital letters are input according to the directions of the 4-D keys A and B.

If the controller 10 determines that only the 4-D key B has been pressed in steps 402 and 404, it inputs one of O, E, I, U, A according to the pressed direction of the 4-D key B in step 418.

FIGS. 16A to 17B illustrate input of Korean alphabet characters by combining the two 4-D keys in the Korean mode when the mode key 16 is pressed twice.

Figure 16A:
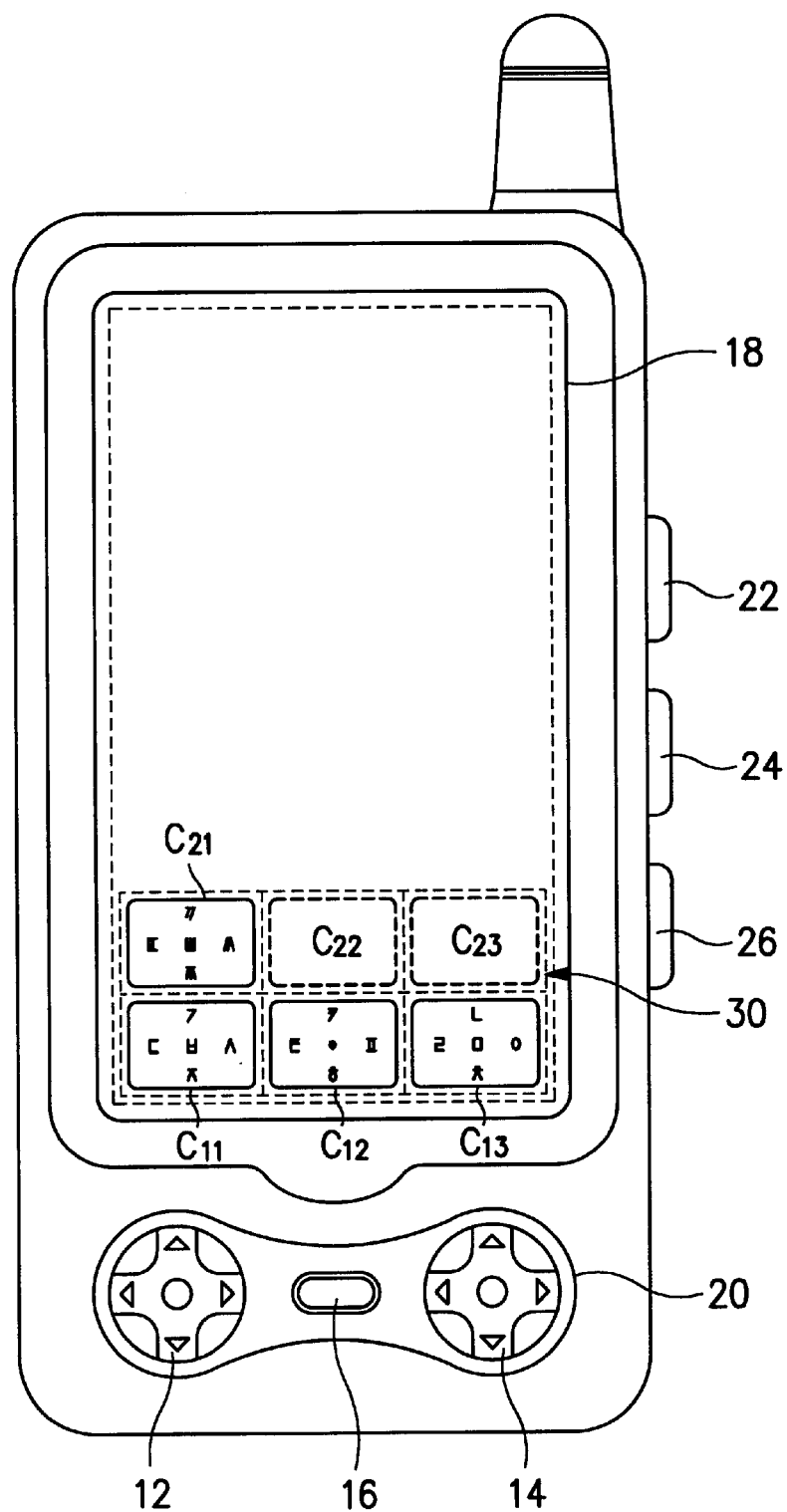
FIG. 16A illustrates a key matrix for a Korean mode according to the second embodiment of the present invention.

FIG. 16A illustrates the display 18 with a key matrix for the Korean mode according to the second embodiment of the present invention. The key matrix 30 with cells of Korean alphabet characters $C_{11}$, $C_{12}$, $C_{13}$, $C_{21}$ is displayed on the display 18. A Korean alphabet character can be selected by using the two 4-D keys in combination. Double consonants "ㄲ, ㄸ, ㅆ, ㅃ, ㅉ" are collected in the cell $C_{21}$ and successive two pressings of the 4-D key A in the direction B moves the cursor to the cell $C_{21}$ so as to increase key input convenience and minimize unnecessary key inputs.

Figure 16B:
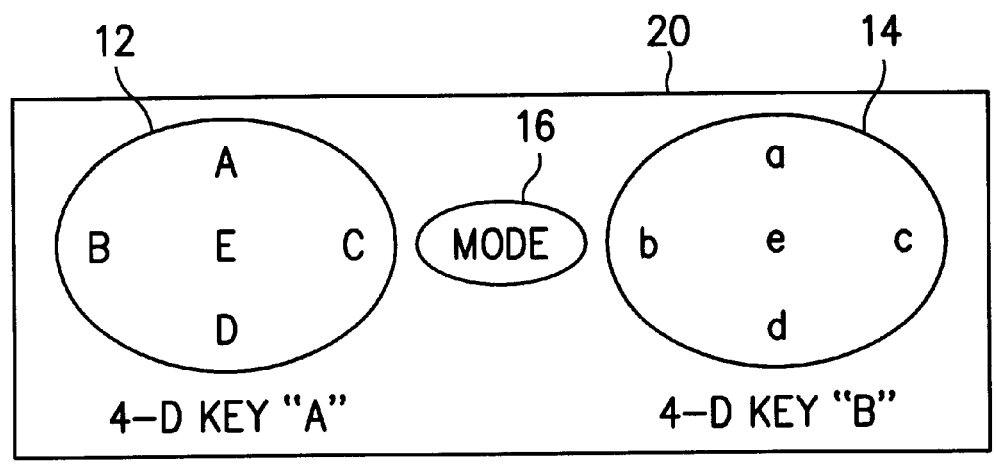
FIG. 16B illustrates the keypad including the two 4-D keys for inputting Korean alphabet characters in the Korean mode according to the second embodiment of the present invention.

FIG. 16B illustrates the keypad including the two 4-D keys which are used in combination to input Korean alphabet characters in the Korean mode according to the second embodiment of the present invention. To identify the keys and directions, the directions of the 4-D key A are labeled with English capital alphabet letters and those of the 4-D key B, with English small alphabet letters in the second embodiment of the present invention.

FIG. 16C is a table showing 30 combinations of the two 4-D keys to set Korean alphabet characters in the Korean mode according to the second embodiment of the present invention. In the Korean mode, vowels are selected using the 4-D key B 14, relying on the "Cheon-Ji-In" scheme. In this scheme, vowels "ㅣ" and "ㅡ" are produced by continuously pressing the 4-D key B 14 up and down (a & d directions) and left and right (b & c directions), respectively and vowel "•" is input by pressing the 4-D key B 14 in the direction e.

FIG. 16D is a table illustrating the Korean alphabet characters versus combinations of the two 4-D keys in the Korean mode according to the second embodiment of the present invention.

Figure 17A:
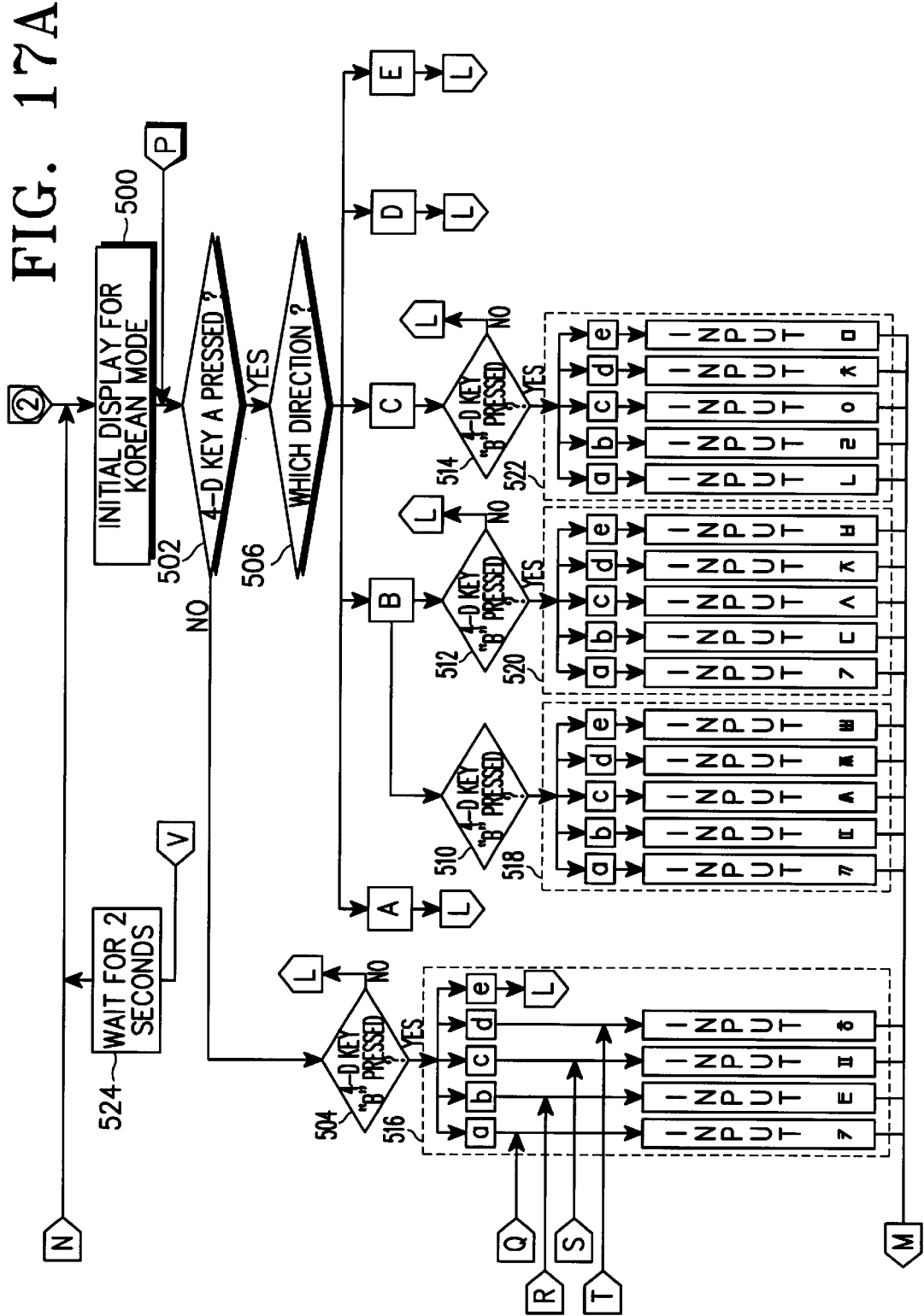
FIG. 17A is a flowchart illustrating a method of selecting Korean consonants utilizing the two 4-D keys in the Korean mode according to the second embodiment of the present invention.

FIG. 17A is a flowchart illustrating a method of selecting Korean consonants using the two 4-D keys in the Korean mode according to the second embodiment of the present invention. Referring to FIG. 17A, the controller 10 sets the Korean mode when the mode key 16 is pressed twice in step 102 of FIG. 9. In step 500 of FIG. 17A, the controller 10 provides an initial display for the Korean mode as shown in FIG. 17A. In step 502, the controller 10 determines whether the 4-D key A has been pressed. If the 4-D key A was pressed, the controller 10 determines in which direction it was pressed in step 506. On the other hand, if the 4-D key A was not pressed in step 502, the controller 10 determines whether the 4-D key B has been pressed in step 504.

In step 506, the controller 10 proceeds in the pressed direction of the 4-D key A in the keypad 20 of FIG. 16B. For example, if the 4-D key A is pressed left, the controller 10 is directed to B and determines how many times the 4-D key A has been pressed in the direction of B. If the 4-D key A was pressed twice in the direction B, the controller 10 inputs one of the double consonants "ㄱ, ㄷ, ㅅ, ㅂ, ㅈ" according to the pressed direction of the 4-D key B in step 518. If the 4-D key A was pressed once in the direction B in step 512, the controller 10 inputs one of consonants "ㄱ, ㄷ, ㅅ, ㅂ, ㅈ" according to the pressed direction of the 4-D key B in step 520. On the other hand, if the 4-D key B was not pressed in step 512, the controller 10 goes to step 524. In step 524, the controller 10 waits for two seconds and then returns to step 500. Upon input of the 4-D key B in the directions A, B, and C in step 506, the controller 10 inputs corresponding characters as shown in FIG. 17A and goes to step 526 of FIG. 17B. In the same manner, the other Korean alphabet characters are input according to the directions of the 4-D keys A and B.

If the controller 10 determines that only the 4-D key B has been pressed in steps 502 and 504, it inputs one of ㄱ, ㄷ, ㅅ, ㅎ according to the direction of the 4-D key B in step 516.

Figure 17B:
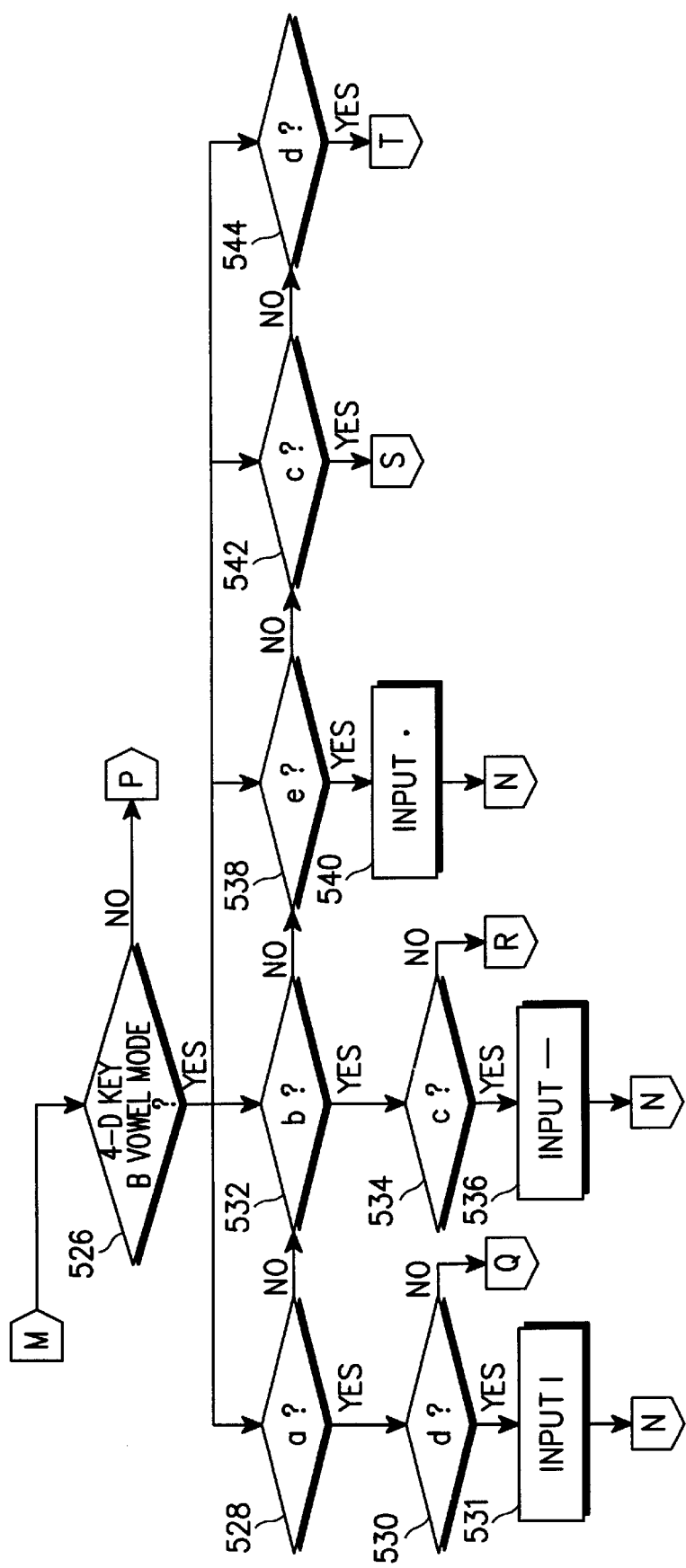
FIG. 17B is a flowchart illustrating a method of selecting Korean vowels utilizing the two 4-D keys in the Korean mode according to the second embodiment of the present invention.

FIG. 17B is a flowchart illustrating a method of selecting Korean vowels using the two 4-D keys in the Korean mode after the procedure shown in FIG. 17A according to the second embodiment of the present invention. Referring to FIG. 17B, the controller 10 determines whether the 4-D key B has been pressed in step 526, after a particular Korean consonant was input. If the 4-D key B was pressed, the controller 10 determines in which direction it was pressed in steps 528, 532, 538, 542, and 544. On the other hand, if the 4-D key B was not pressed in step 526, the controller 10 returns to step 502 of FIG. 17A.

If the 4-D key A is pressed in the direction a in step 528, the controller 10 determines whether the 4-D key A is pressed again in the direction d in step 530. If it is, the controller 10 inputs the vowel "ㅣ" in step 531 and returns to step 500 to stand by for input of a new Korean alphabet character. If the 4-D key A is not pressed in the direction d in step 530, the controller 10 inputs ㄱ in step 516 of FIG. 17A.

If the 4-D key A is pressed in the direction b in step 532, the controller 10 determines whether the 4-D key A is pressed again in the direction c in step 534. If it is, the controller 10 inputs the vowel "—" in step 536 and returns to step 500 to stand by for input of a new Korean alphabet character. If the 4-D key A is not pressed in the direction c in step 534, the controller 10 inputs ㄷ in step 516 of FIG. 17A.

If the 4-D key A is pressed in the direction e in step 538, the controller 10 inputs the vowel "•" in step 540 and returns to step 500 to stand by for input of a new Korean alphabet character. If the 4-D key A is not pressed in the direction e in step 538, the controller 10 determines whether the 4-D key A is pressed in the directions c and d in steps 542 and 544.

If the 4-D key A is pressed in the direction c in step 542, the controller 10 inputs ㅈ in step 516 of FIG. 17A. If the 4-D key A is pressed in the direction d in step 544, the controller 10 inputs ㅎ in step 516 of FIG. 17A.

As described above, the present invention provides a key structure that occupies a minimum area and a user-friendly interface. Therefore, the present invention is useful for implementation as a character input device and method in a subminiature mobile radio terminal or a device requiring a very small keypad. In addition, the number of key inputs can be remarkably reduced because a cursor for 4-D keys automatically returns to its home position after one digit/letter/character/symbol is input and frequently used characters (e.g., vowels in the English modes) and/or symbols are collected in one cell. Key matrixes for different modes are preset with the mode key and each key matrix is divided into a plurality of cells, so that the key matrixes are readily expandable and individual characters can be easily added to the cells in each key matrix.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A key input device for inputting digits/letters/characters/symbols by a keypad, comprising:
   a mode key for selecting one of a plurality of key matrixes for a corresponding mode, which is displayed on a display, wherein different modes are set according to how many times the mode key is pressed and the key matrix specific to a set mode is displayed on a display;
   a first directional key for inter-cell movement in the displayed key matrix, wherein a home position of a cursor for the first directional key is the center of each key matrix; and
   a second directional key for selecting an intended digit/letter/character/symbol within a cell.

2. The key input device of claim 1, wherein a digit mode, a Korean mode, an English capital mode, and an English small mode are sequentially set by sequentially pressing the mode key.

3. The key input device of claim 2, wherein the different modes further includes a special character mode.

4. The key input device of claim 1, wherein the first directional key controls the functions of confirmation, a menu, mail, and a phone book without using the mode key.

5. The key input device of claim 1, wherein a home position of a cursor for the second directional key is the center of a center cell in each key matrix.

6. The key input device of claim 1, wherein a cursor of the second directional key returns to a home position after said digit/letter/character/symbol is selected.

7. A key input device for inputting digits/letters/character/symbols by a keypad, comprising:
   a mode key for selecting one of a plurality of key matrixes for a corresponding mode, which is displayed on a display; and
   two directional keys that are used in combination to enter an intended digit/letter/character/symbol within the key matrix, wherein function keys and hot keys are set by combining the two directional keys without using the mode key.

8. The key input device of claim 7, wherein one of the two directional keys is used for inter-cell movement in the key matrix and the other directional key is used to select the intended digit/letter/character/symbol within a cell.

9. The key input device of claim 7, wherein a home position of a cursor for the directional key that moves between cells is the center of each key matrix.

10. The key input device of claim 7, wherein a home position of a cursor for the directional key that selects the digit/letter/character/symbol is the center of a center cell in each key matrix.

11. The key input device of claim 7, wherein a cursor of the directional key that selects the digit/letter/character/symbol returns to a home position after the digit/letter/character/symbol is selected.

12. A character input method for a digit/letter/character/symbol input device using a keypad, comprising the steps of:

setting a mode with a unique key matrix by pressing a mode key, wherein different modes are set according to how many times the mode key is pressed and the key matrix specific to a set mode is displayed on a display;

moving to an intended cell within the key matrix by pressing a first directional key, wherein a home position of a cursor for the first directional key is the center of each key matrix;

selecting an intended digit/letter/character/symbol in the intended cell by pressing a second directional key; and displaying the selected digit/letter/character/symbol on a display.

13. The character input method of claim 12, wherein a digit mode, a Korean mode, an English capital mode, and an English small mode are sequentially set by sequentially pressing the mode key.

14. The character input method of claim 13, wherein a special character mode is set when the mode key is pressed five times.

15. The character input method of claim 13, wherein Korean vowels in the Korean mode are input by pressing the first directional key successively in two directions according to a "Cheon-Ji-In" vowel combination scheme.

* * * * *